(12) United States Patent
Yasui

(10) Patent No.: US 7,506,620 B2
(45) Date of Patent: Mar. 24, 2009

(54) DEVICE AND METHOD FOR CONTROLLING INTERNAL COMBUSTION ENGINE WITH UNIVERSAL VALVE GEAR SYSTEM AND VARIABLE COMPRESSING MECHANISM

(75) Inventor: Yuji Yasui, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/580,857

(22) PCT Filed: Dec. 7, 2004

(86) PCT No.: PCT/JP2004/018546

§ 371 (c)(1),
(2), (4) Date: Apr. 9, 2007

(87) PCT Pub. No.: WO2005/059335

PCT Pub. Date: Jun. 30, 2005

(65) Prior Publication Data

US 2007/0266974 A1    Nov. 22, 2007

(30) Foreign Application Priority Data

Dec. 17, 2003    (JP) .............................. 2003-419012

(51) Int. Cl.
*F02B 75/04* (2006.01)
*F01L 1/34* (2006.01)
(52) U.S. Cl. ................. 123/48 R; 123/78 R; 123/90.15
(58) Field of Classification Search ...... 123/48 R–48 D, 123/78 R–78 F, 90.11–90.18
See application file for complete search history.

(56) References Cited

U.S. PATENT DOCUMENTS

| 6,595,186 B2 * | 7/2003 | Hiyoshi et al. ............ 123/78 E |
| 6,691,655 B2 * | 2/2004 | Aoyama et al. ........... 123/48 B |

FOREIGN PATENT DOCUMENTS

| JP | 7-197846 A | 8/1995 |
| JP | 8-284702 A | 10/1996 |
| JP | 2000-227033 A | 8/2000 |
| JP | 2001-263099 A | 9/2001 |
| JP | 2003-090236 A | 3/2003 |
| JP | 2005-002931 A | 1/2005 |

* cited by examiner

*Primary Examiner*—Noah Kamen
(74) *Attorney, Agent, or Firm*—Arent Fox LLP

(57) ABSTRACT

A control device for controlling an engine, comprising a variable lift mechanism capable of changing the lift of a valve and a variable compression ratio mechanism capable of changing a compression ratio in a combustion chamber. The control devise controls the variable lift mechanisms and the variable compression ratio mechanism so that, when a requested engine output is increased, a compression ratio decreasing rate is increased over a lift increasing rate and, when the requested engine output is reduced, a lift decreasing rate is increased over a compression ratio increasing rate. When the engine comprises a variable phase mechanism capable of changing the phase of the valve, the control devise controls the variable compression ratio mechanism and the variable phase mechanism so that, when the requested engine output is increased, the compression ratio decreasing rate is increased over the change rate of the phase to a delay angle and, when the requested engine output is reduced, the change rate of the phase to an advance angle is increased over the compression ratio increasing rate. Thus, the contact of the valve with a piston can be avoided.

30 Claims, 24 Drawing Sheets

Figure 3
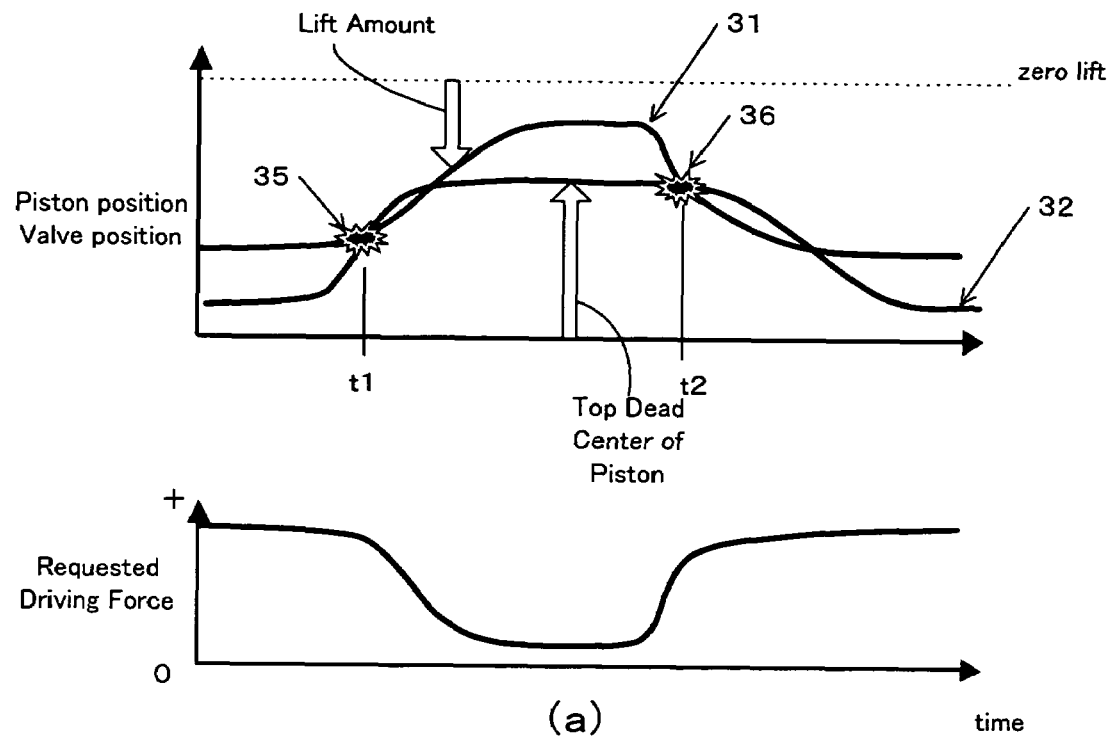
(a)
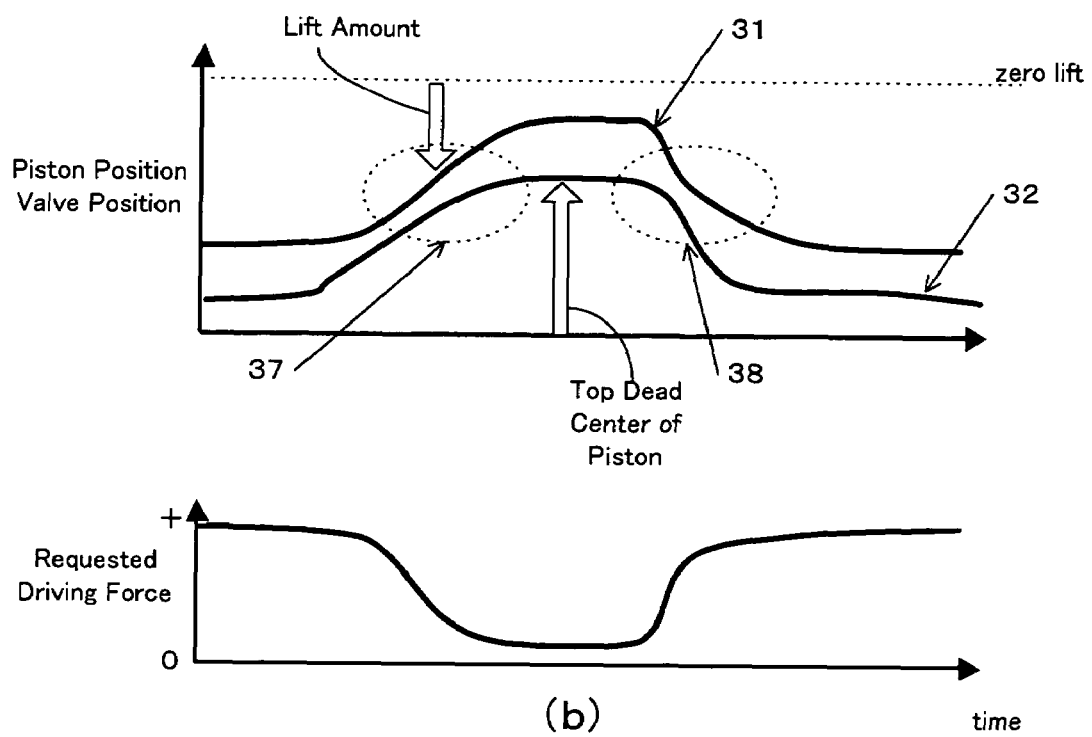
(b)

Figure 5

| Mode | Mode1 | Mode2 | Mode3 | Mode4 |
|---|---|---|---|---|
| Operating Condition of Engine | Load: Extremely Low Requested Driving Force: Increase | Load: Extremely Low Requested Driving Force: Decrease | Load: Low ~ High Requested Driving Force: Increase | Load: High ~ Low Requested Driving Force: Decrease |
| Master Parameter | Compression Ratio Cr<br><br>Determine Desired Value Cr_cmd According to Desired Intake Air Amount Gcyl_cmd | Phase Cain<br><br>Determine Desired Value Cain_cmd According to Desired Intake Air Amount Gcyl_cmd | Compression Ratio Cr<br><br>Determine Desired Value Cr_cmd According to Desired Intake Air Amount Gcyl_cmd | Lift Amount Lift<br><br>Determine Desired Value Lift_cmd According to Desired Intake Air Amount Gcyl_cmd |
| First Slave Parameter | Phase Cain<br><br>Determine Desired Value Cain_cmd Based on Compression Ratio Cr | Lift Amount Lift<br><br>Determine Desired Value Lift_cmd Based on Phase Cain | Lift Amount Lift<br><br>Determine Desired Value Lift_cmd Based on Compression Ratio Cr | Compression Ratio Cr<br><br>Determine Desired Value Cr_cmd Based on Lift Amount Lift |
| Second Slave Parameter | Lift Amount Lift<br><br>Determine Desired Value Lift_cmd Based on Phase Cain | Compression Ratio Cr<br><br>Determine Desired Value Cr_cmd Based on Lift Amount Lift | Phase Cain<br><br>Determine Desired Value Cain_cmd Based on Lift Amount Lift | Phase Cain<br><br>Determine Desired Value Cain_cmd Based on Lift Amount Lift |

Figure 11
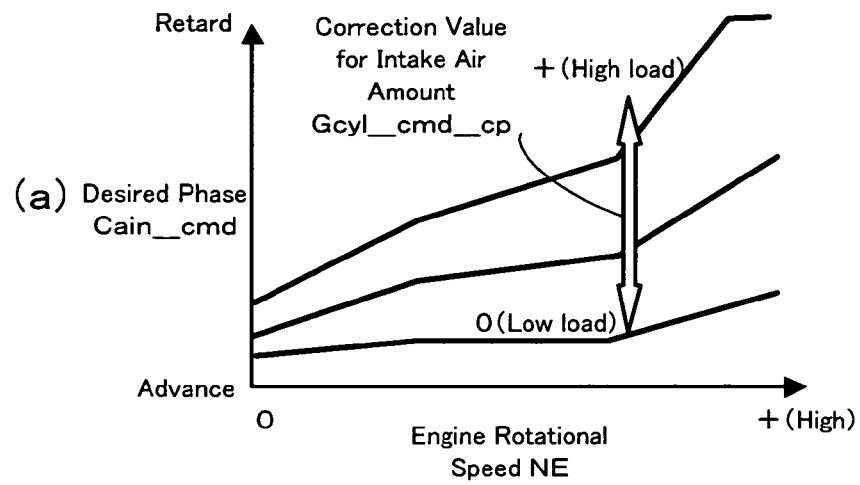
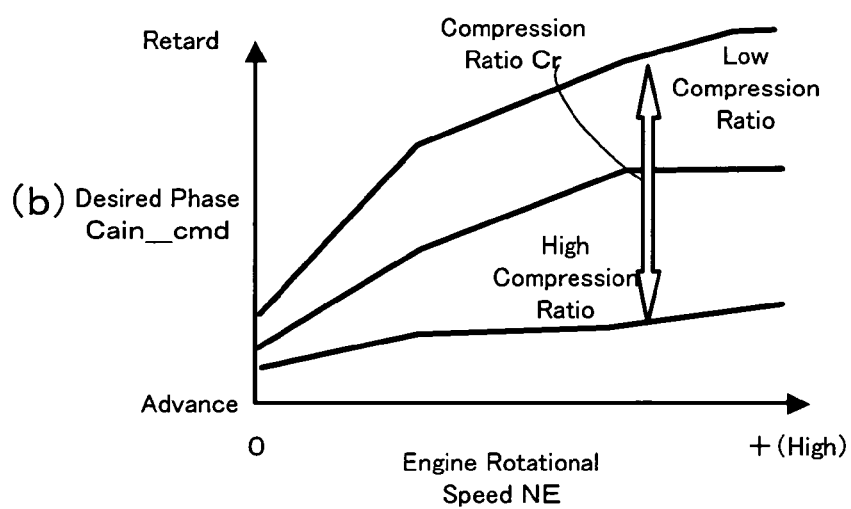
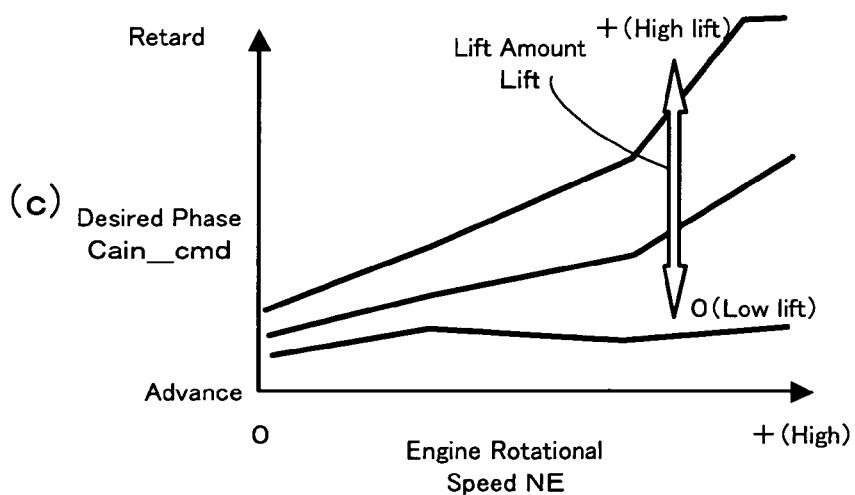

DEVICE AND METHOD FOR CONTROLLING INTERNAL COMBUSTION ENGINE WITH UNIVERSAL VALVE GEAR SYSTEM AND VARIABLE COMPRESSING MECHANISM

CROSS-REFERENCE TO RELATED APPLICATION

This application is a National Stage entry of International Application No. PCT/JP2004/018546, filed Dec. 7, 2004, the entire specification claims and drawings of which are incorporated herewith by reference.

BACKGROUND OF THE INVENTION

The present invention relates to an apparatus and a method for controlling an internal combustion engine having a variable valve driving system and a variable compression ratio mechanism.

Some of valve driving systems for an internal combustion engine (referred to as an engine hereinafter) are capable of variably controlling the amount of lift of an intake/exhaust valve. Through such control of the intake/exhaust valve, a desired engine output can be generated. On the other hand, a variable compression ratio mechanism for variably controlling a compression ratio in a combustion chamber of an engine has been proposed.

Japanese Patent Application Unexamined Publication (Kokai) No. 2001-263099 discloses a scheme for preventing interference between a piston and an intake valve when a variable compression ratio mechanism for changing a compression ratio by changing the position of the top dead center (TDC) of the piston is used. According to this scheme, under a high compression ratio where the TDC position of the piston becomes high, the timing for opening the intake valve is retarded or a lift amount of the intake valve is decreased.

If an engine output is controlled by the lift amount of the valve, a pumping loss can be decreased and fuel efficiency can be improved. If the compression ratio is controlled based on the operating condition of the engine, the combustion stability can be improved when the engine load is low, and the amount of retarding the ignition timing, which is required for suppressing knocking, can be decreased when the engine load is high.

As the compression ratio increases, the TDC position of the piston approaches the cylinder head. As shown in FIGS. 24(a) and 24(c), when the compression ratio is low, the valve and the piston do not contact each other regardless of the lift amount of the valve because the TDC position of the piston is low. As shown in FIG. 24(b), when the compression ratio is high, the valve and the piston do not contact with each other as long as the lift amount of the valve is small. However, as shown in FIG. 24(d), when the compression ratio is high, the lift amount of the valve may become large, for example, in a transient condition of a valve driving system and/or a compression ratio mechanism. If such a high lift occurs when the compression ratio is high, the valve and the piston may collide with each other. Such a collision may cause damage in the engine.

In order to avoid such a collision, a sufficient amount of "recess" may be provided in the piston. However, if such a recess is provided in the piston, the shape of the upper portion of the piston is complicated, which may cause deterioration in the combustion.

Therefore, there is a need for a control apparatus that is capable of avoiding a collision between a valve and a piston in an engine having a valve driving system that is capable of changing the lift amount of the valve and a variable compression ratio system that is capable of changing the compression ratio.

Furthermore, some of valve driving systems are capable of variably controlling a phase of the valve. In an engine having such a valve driving system and a variable compression ratio mechanism, the following problems may arise. Referring to FIG. 25(a), a reference number 101 indicates the lift amount of a valve and a reference number 102 indicates the position of a piston. When the piston almost reaches TDC, the valve starts to open (at time t1). When the valve opens at a normal phase or at a retarded phase as in this case, the valve and the piston do not collide with each other. However, referring to FIG. 25(b), the phase of the valve is advanced. The valve starts to open before the piston reaches TDC. In this case, the valve and the piston may collide with each other (at time t2).

Therefore, there is a need for a control apparatus that is capable of avoiding a collision between a valve and a piston in an engine further having a valve driving system that is capable of changing a phase of the valve.

SUMMARY OF THE INVENTION

According to one aspect of the invention, a control apparatus for an engine having a variable lift mechanism that is capable of changing a lift amount of a valve and a variable compression ratio mechanism that is capable of changing a compression ratio in a combustion chamber is provided. The control apparatus controls the variable lift mechanism and the variable compression ratio mechanism so that a rate that the compression ratio decreases is faster than a rate that the lift amount increases when a requested engine output is increasing. The control apparatus further controls the variable lift mechanism and the variable compression ratio mechanism so that a rate that the lift amount decreases is faster than a rate that the compression ratio increases when the requested engine output is decreasing. According to the invention, a collision between the valve and the piston can be avoided while the intake air amount corresponding to the requested engine amount is implemented.

According to one embodiment of the invention, a variable phase mechanism that is capable of changing a phase of the valve is provided. The control apparatus controls the variable compression ratio mechanism and the variable phase mechanism so that a rate that the compression ratio decreases is faster than a rate that the phase is retarded when the requested engine output is increasing. The control apparatus controls the variable compression ratio mechanism and the variable phase mechanism so that a rate that the phase is advanced is faster than a rate that the compression ratio increases when the requested engine output is decreasing. According to the invention, a collision between the valve and the piston can be avoided while the intake air amount corresponding to the requested engine amount is implemented.

According to another aspect of the invention, a control apparatus comprises a compression ratio controller for controlling a compression ratio in the combustion chamber of the engine and a lift controller for controlling a lift amount of the valve of the engine. The control apparatus further comprises a master-slave switching unit for selecting one of the compression ratio and the lift amount as a master parameter and the other as a slave parameter based on the requested engine output. The master-slave switching unit designates one of the compression ratio controller and the lift controller that controls the master parameter as a master controller and the other controller that controls the slave parameter as a slave controller. The master controller determines a desired value of the master parameter based on the requested engine output and then controls the master parameter to converge to that desired value. The slave controller determines a desired value of the slave parameter based on an actual measured value of the master parameter acquired as a result of controlling the master parameter and then controls the slave parameter to converge to the desired value. Thus, a changing rate of the master parameter can be controlled to be faster than a changing rate of the slave parameter.

According to the invention, since the master parameter and the slave parameter are controlled so that the slave parameter follows the master parameter, a collision between the valve and the piston can be avoided while the intake air amount corresponding to the requested engine amount is implemented.

According to one embodiment of the invention, the control apparatus further comprises a phase controller for controlling a phase of the valve of the engine. The master-slave switching unit selects one of the compression ratio, the lift amount and the phase as a master parameter and the others as slave parameters based on the requested engine output. The master-slave switching unit designates one of the compression ratio controller, the lift controller and the phase controller that controls the master parameter as a master controller and the other controllers that control the slave parameters as slave controllers.

According to one embodiment of the invention, the master-slave switching unit selects the compression ratio as the master parameter and the lift amount as the slave parameter when the requested engine output is increasing. The master-slave switching unit selects the lift amount as the master parameter and the compression ratio as the slave parameter when the requested engine output is decreasing. According to the invention, since the master parameter and the slave parameter are switched in accordance with the increase/decrease of the requested engine output, a collision between the valve and the piston can be avoided while the intake air amount corresponding to the requested engine amount is implemented.

According to one embodiment of the invention, the master-slave switching unit selects the compression ratio as the master parameter and the lift amount and the phase as the slave parameters when the engine load is extremely low and the requested engine output is increasing. The master-slave switching unit selects the phase as the master parameter and the lift amount and the compression ratio as the slave parameters when the engine load is extremely low and the requested engine output is decreasing. According to the invention, since the master and slave parameters are switched in response to a condition where the engine load is extremely low, a collision between the valve and the piston can be avoided while the intake air amount corresponding to the requested engine amount is implemented.

According to another embodiment of the invention, the lift controller sets a desired value for the lift amount based on an actual measured value of the phase acquired as a result of the control by the phase controller when the engine load is extremely low. According to the invention, a very small intake air amount can be controlled by the phase controller when the engine load is extremely low.

According to another embodiment of the invention, the master controller is configured to perform a response assignment control that is capable of specifying a response speed of the master parameter to a desired value and the slave controller is configured to perform a response assignment control that is capable of specifying a response speed of the slave parameter to a desired value. The response speed of the master parameter is set to be faster than the response speed of the slave parameter. According to the invention, the master parameter can converge more quickly than the slave parameter, so that it is more surely prevented that the slave parameter outpaces the master parameter.

According to another aspect of the invention, the control apparatus comprises an intake air amount controller for determining an intake air amount correction value for causing the intake air amount into the engine to converge to a desired intake air amount that implements the requested engine output. The master controller determines a desired value of the master parameter based on the correction value. According to the invention, the accuracy that the actual intake air amount follows the desired intake air amount can be improved.

According to one embodiment of the invention, the intake air amount controller performs a response assignment control that is capable of specifying a response speed of the intake air amount to the desired intake air amount. The intake air amount controller sets the response speed in accordance with whether the requested engine output is increasing or decreasing. According to the invention, when the requested driving force is increasing, the drivability can be improved by increasing the response speed of the intake air amount. According to another embodiment of the invention, the response speed of the intake air amount is set in accordance with the engine load. According to the invention, the requested engine output can be achieved quickly in accordance with the engine load.

According to one embodiment of the invention, an operation cycle in which the intake air amount correction value is determined by the intake air amount controller is set to be longer than an operation cycle in which the master parameter and the slave parameter are determined by the master controller and the slave controller. According to the invention, since the desired values of the master and slave parameters are set in a cycle that is adjusted to changes of the intake air amount having relatively slow response characteristics, the master parameter and the slave parameter can be controlled to follow the intake air amount with desired accuracy. Non-linear characteristics caused by the friction or the like may appear in the behaviors of the variable compression ratio mechanism, the variable lift mechanism and the variable phase mechanism. If the control of the master and slave parameters is performed in a relatively short cycle, it can be prevented that such non-linear characteristics influence the master and slave parameters.

BRIEF DESCRIPTION OF THE DRAWINGS

FIG. 3 shows a principle of a scheme for avoiding a collision between a valve and a piston in accordance with one embodiment of the present invention.

FIG. 5 is a table showing a rule for determining a master parameter and slave parameters in each mode in accordance with one embodiment of the present invention.

FIG. 11 shows an example of tables that are used for determining a desired phase in accordance with one embodiment of the present invention.

DESCRIPTION OF THE PREFERRED EMBODIMENTS

Structure of Engine and Control Unit

Figure 1:
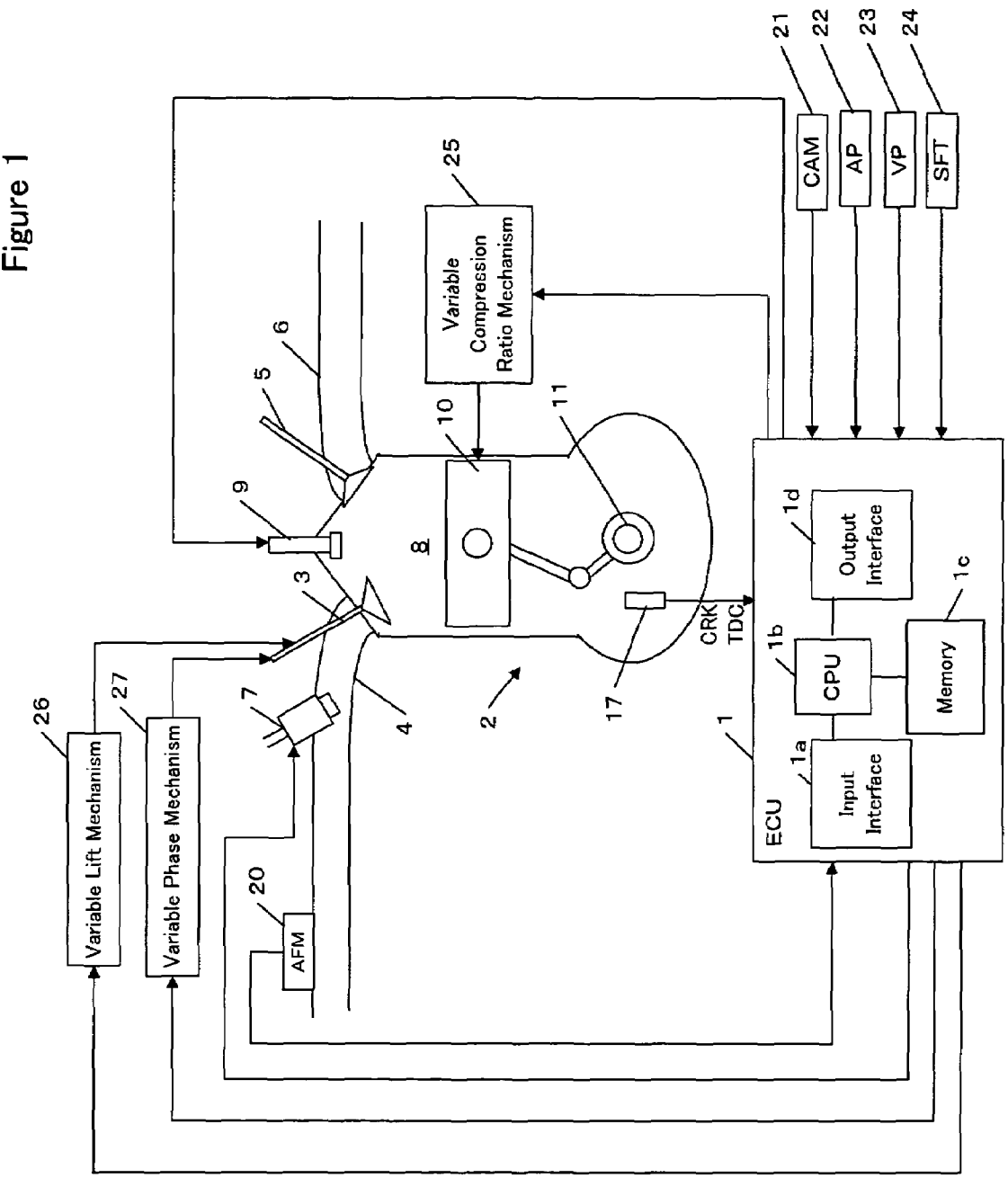
FIG. 1 is a block diagram showing an engine and its control unit in accordance with one embodiment of the present invention.

Referring to the drawings, specific embodiments of the invention will be described. FIG. 1 is a block diagram showing an engine and a control unit for the engine in accordance with one embodiment of the invention.

An electronic control unit (hereinafter referred to as an ECU) 1 comprises an input interface 1a for receiving data sent from each part of the vehicle, a CPU 1b for carrying out operations for controlling various parts of the vehicle, a memory 1c including a read only memory (ROM) and a random access memory (RAM), and an output interface 1d for sending a control signal to various parts of the vehicle. Programs and various data for controlling each part of the vehicle are stored in the ROM. A program and data for implementing a control in accordance with the invention are stored in the ROM. The ROM may be a rewritable ROM such as an EPROM. The RAM provides work areas for operations by the CPU 1b, in which data sent from each part of the vehicle as well as control signals to be sent out to each part of the vehicle are temporarily stored.

An engine 2 is, for example, a 4-cycle engine. The engine 2 is connected to an intake manifold 4 through an intake valve 3 and connected to an exhaust manifold 6 through an exhaust valve 5. A fuel injection valve 7 is provided, for each cylinder, in the intake manifold 4. The fuel injection valve 7 injects fuel in accordance with a control signal from the ECU 1.

The engine 2 introduces into a combustion chamber 8 a mixture of intake air from the intake manifold 4 and fuel injected from the fuel injection valve 7. A spark plug 9 for generating a spark in accordance with an ignition timing signal from the ECU 1 is provided in the combustion chamber 8. The spark from the spark plug 9 causes the combustion of the mixture. The combustion increases the volume of the mixture, thereby pushing the piston 10 down. The reciprocal motion of the piston 10 is converted into the rotational motion of the crank shaft 11.

A crank angle sensor 17 is disposed in the engine 2. The crank angle sensor 17 outputs a CRK signal and a TDC signal to the ECU 1 in accordance with the rotation of the crankshaft 11.

The CRK signal is a pulse signal that is output at every predetermined crank angle (for example, 30 degrees). The ECU 1 calculates a rotational speed NE of the engine 2 in accordance with the CRK signal. The TDC signal is also a pulse signal that is output at a crank angle associated with a TDC (top dead center) position of the piston 10.

An airflow meter (AFM) 20 is disposed upstream of the intake manifold 4. The airflow meter 20 detects the amount of air introduced in the combustion chamber 8 through the intake manifold (referred to as an intake air amount) and sends it to the ECU 1.

A cam angle sensor 21 is connected to the ECU 1. As the intake camshaft (not shown) rotates, the cam angle sensor 21 outputs to the ECU 1 a CAM signal, which is a pulse signal, at every predetermined cam angle (for example, for every one degree). The ECU 1 determines an actual phase Cain of the intake camshaft with respect to the crankshaft 11 based on the CRK signal and CAM signal.

An accelerator pedal opening angle sensor 22 is connected to the ECU 1. The accelerator pedal opening sensor 22 detects an opening angle of an accelerator pedal and sends it to the ECU 1.

A vehicle speed sensor 23 and a shift sensor 24 are connected to the ECU 1. These sensors detect a vehicle speed and a selected transmission gear ratio respectively and send them to the ECU 1.

A variable compression ratio mechanism 25 is a mechanism that is capable of changing a compression ratio within the combustion chamber in accordance with a control signal from the ECU 1. The variable compression ratio mechanism 25 can be implemented by any known technique. For example, Japanese Patent Application Unexamined Publication No. H08-284702 discloses a technique for changing a compression ratio according to the operating condition of the engine by changing the position of the piston using a hydraulic pressure.

The variable compression ratio mechanism 25 includes a sensor for detecting a change in the volume of the combustion chamber. The detected change in the volume of the combustion chamber is sent to the ECU 1, which calculates an actual compression ratio Cr based on the detected change in the volume of the combustion chamber. Alternatively, the actual compression ratio Cr may be measured by any other technique. For example, a rotation angle of the crankshaft may be detected so as to determine the compression ratio based on the detected rotation angle.

A variable lift mechanism 26 is a mechanism that is capable of changing the amount of lift of the intake valve 3 in accordance with a control signal from the ECU 1. The variable lift mechanism 26 can be implemented by any known technique. For example, a so-called VTEC mechanism includes multiple cams having different forms so as to switch the cams in accordance with the operating condition of the engine. The lift amount of the intake valve is different depending on the selected cam (refer to, for example, Japanese Patent Application Unexamined Publication (Kokai) H07-197846). Of course, the variable lift mechanism 26 may be configured to change the amount of lift of the exhaust valve 5 additionally.

The variable lift mechanism 26 includes a structure for detecting an actual lift amount Lift of the intake valve. For example, the mechanism 26 may include a sensor for detecting the movement of an actuator for driving the intake valve. The ECU 1 can determine an actual lift amount Lift based on the detected movement.

A variable phase mechanism (which is called a VTC) 27 is a mechanism that is capable of changing an opening/closing timing of the intake valve 3 in accordance with a control signal from the ECU 1. The variable phase mechanism 27 can be implemented by any known technique. For example, technique for controlling a phase of the intake valve to advance or retard by using a hydraulic pressure (refer to, for example, Japanese Patent Application Unexamined Publication (Kokai) No. 2000-227033) has been proposed. Of course, the variable phase mechanism 27 may be configured to change a phase of the exhaust valve 5 additionally.

Alternatively, the variable lift mechanism and the variable phase mechanism may be integrated into a single system.

In the following description, a system including the variable lift mechanism and/or the variable phase mechanism may be referred to as a variable valve driving system.

Signals sent to the ECU 1 are passed to the input interface 1a. The input interface 5a converts analog signal values into digital signal values. The CPU 1b processes the resulting digital signals, performs operations in accordance with one or more programs stored in the memory 1c, and creates control signals. The output interface 1d sends these control signals to actuators for the fuel injection valve 7, spark plug 9 and other mechanical components.

General Principle of the Invention

Figure 2:
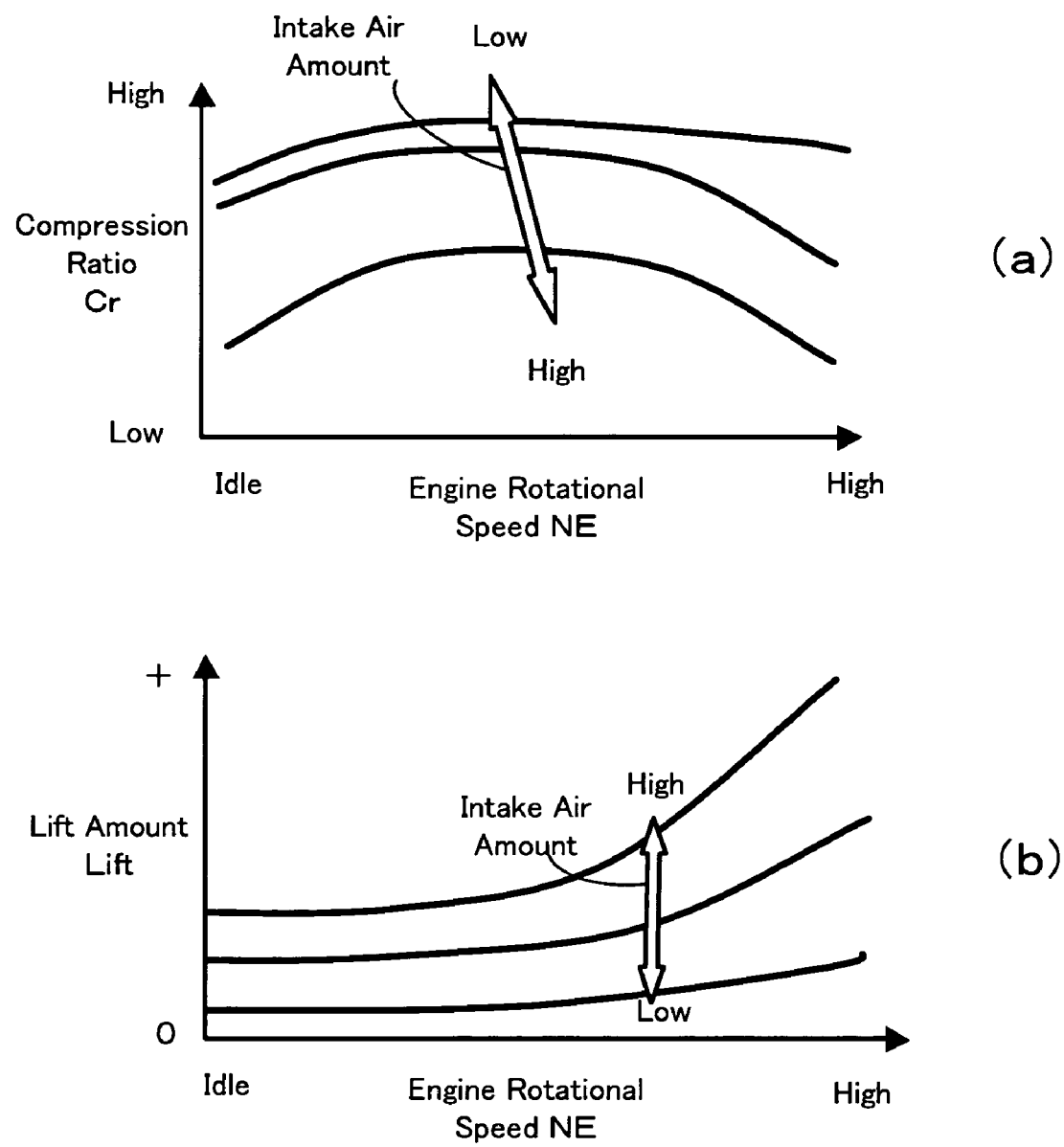
FIG. 2 shows (a) a relationship between an intake air amount and a compression ratio and (b) a relationship between an intake air amount and a lift amount in accordance with one embodiment of the present invention.

For the sake of easier understanding of the invention, the general principle of the invention will be described first referring to FIGS. 2 and 3.

FIG. 2(a) shows a map of a compression ratio that is to be set in accordance with the operating condition of the engine. The compression ratio is controlled to become lower as the intake air amount increases. FIG. 2(b) shows a map of a lift amount that is to be set in accordance with the operating condition of the engine. The lift amount is controlled to increase as the intake air amount increases.

The intake air amount typically changes in accordance with a driving force that is requested by a driver. Such a driving force, which may be referred to as an engine output, is typically represented by an accelerator pedal opening angle AP. As can be seen from FIGS. 2(a) and 2(b), a collision between the intake valve and the piston may occur in the following conditions:

(1) an increasing speed of the compression ratio is faster than a decreasing speed of the lift amount when the requested driving force is decreasing; and (2) an increasing speed of the lift amount is faster than a decreasing speed of the compression ratio when the requested driving force is increasing.

FIG. 3(a) shows a case where the valve and the piston collide with each other. The lift amount of the valve is indicated by a reference number 31 and the position of the piston is indicated by a reference number 32. A reference number 35 indicates a collision in the above-described condition (1) and a reference number 36 indicates a collision in the above-described condition (2).

FIG. 3(b) shows a case where there is no collision between the valve and the piston. In an area 37 where the requested driving force is decreasing, there is no collision between the valve and the piston because the decreasing speed of the lift amount is faster than the increasing speed of the compression ratio. In an area 38 where the requested driving force is increasing, there is no collision between the valve and the piston because the decreasing speed of the compression ratio is faster than the increasing speed of the lift amount.

In the present invention, the lift amount of the valve and the compression ratio are controlled as shown in FIG. 3(b) so as to avoid a collision between the valve and the piston.

In one embodiment of the present invention, a master-slave mechanism is configured to implement such a control. One of the compression ratio, the lift amount and the phase is selected as a master parameter based on the operating condition of the engine. The others are called slave parameters. The master parameter is controlled so that the intake air amount converges to a desired intake air amount. The slave parameters are controlled based on an actual measured value of the master parameter that is acquired as a result of controlling the master parameter. Through such a master-slave control, a changing rate of the master parameter is controlled to be faster than a changing rate of the slave parameters.

A control as shown in FIG. 3(b) can be implemented by determining the master and slave parameters as described in the following (a) and (b):

(a) the compression ratio is selected as a master parameter and the lift amount as a slave parameter when the requested driving force is increasing; and (b) the lift amount is selected as a master parameter and the compression ratio as a slave parameter when the requested driving force is decreasing.

The response of the intake air amount to changes in the lift amount is quicker than the response of the intake air amount to changes in the phase. Therefore, when the engine load is not extremely low, the phase is controlled based on an actual measured value of the lift amount. Since the lift amount is controlled so that a collision between the piston and the valve is avoided by the master-slave control, there is no possibility that the piston collides with the valve due to such a phase control.

On the other hand, when the engine load is extremely low, a very small amount of the intake air needs to be controlled. In order to control such a very small amount of the intake air, the lift amount needs to be controlled with high accuracy (for example, on the order of micrometers). However, it may be difficult to implement such a high accuracy control for the lift amount by using the variable lift mechanism. In contrast, the variable phase mechanism can change the phase by a very small amount (for example, by 1 degree or the like) and hence can slightly change the intake air amount. Therefore, when the engine load is extremely low, the lift amount is controlled based on an actual measured value of the phase.

Figure 4:
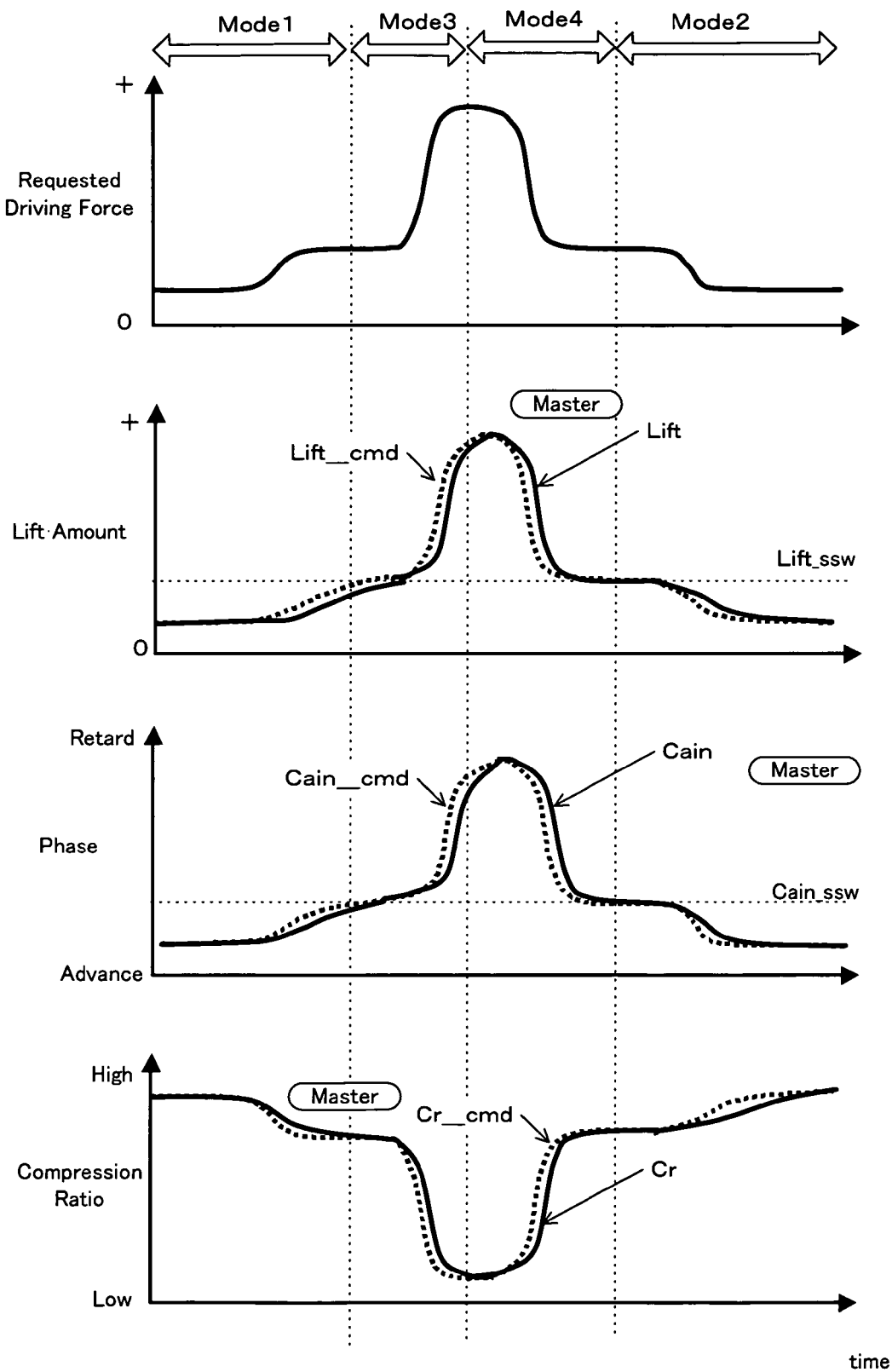
FIG. 4 schematically shows a control for a compression ratio, a lift amount and a phase in each mode in accordance with one embodiment of the present invention.

Referring to FIG. 4, a rule for determining the master and slave parameters will be specifically described. In FIG. 4, a solid line indicates an actual measured value and a dotted line indicates a desired value.

Mode 1 represents a mode where the engine load is extremely low and the requested driving force is increasing. The compression ratio is controlled to become low, the lift amount is controlled to increase and the phase is controlled to be retarded. Under the condition where the requested driving force is increasing, the compression ratio is selected as a master parameter so that the decreasing rate of the compression ratio is faster than the increasing rate of the lift amount. A desired compression ratio Cr_cmd is set so that the actual intake air amount converges to the desired intake air amount. The variable compression ratio mechanism 25 acts so that the actual compression ratio Cr reaches the desired compression ratio Cr_cmd. Since the engine load is extremely low, the phase is controlled prior to the control of the lift amount, as described above. A desired phase Cain_cmd is set based on the actual compression ratio Cr that has been achieved by the variable compression ratio mechanism 25. The variable phase mechanism 27 acts so that the actual phase Cain reaches the desired phase Cain_cmd. Then, a desired lift amount Lift_cmd is set based on the actual phase Cain that has been achieved by the variable phase mechanism 27. The variable lift mechanism 26 acts so that the lift amount Lift reaches the desired lift amount Lift_cmd.

Mode 3 represents a mode where the engine load changes from low to high and the requested driving force is increasing. The compression ratio is controlled to become low, the lift amount is controlled to increase and the phase is controlled to be retarded. In Mode 3, as in Mode 1, the compression ratio is selected as a master parameter so that the decreasing rate of the compression ratio Cr is faster than the increasing rate of the lift amount. The desired compression ratio Cr_cmd is set so that the actual intake air amount converges to the desired intake air amount. The variable compression ratio mechanism 25 acts so that the actual compression ratio Cr reaches the desired compression ratio Cr_cmd. Since the engine load is not extremely low, the lift amount is controlled prior to the control of the phase. The desired lift amount Lift_cmd is set based on the actual compression ratio Cr that has been achieved by the variable compression ratio mechanism 25. The variable lift mechanism 26 acts so that the actual lift amount Lift reaches the desired lift amount Lift_cmd. Then, the desired phase Cain_cmd is set based on the actual lift amount that has been achieved by the variable lift mechanism 26. The variable phase mechanism 27 acts so that the actual phase Cain reaches the desired phase Cain_cmd.

Mode 4 represents a mode where the engine load changes from high to low and the requested driving force is decreasing. The compression ratio is controlled to become high, the lift amount is controlled to decrease and the phase is controlled to be advanced. Under the condition where the requested driving force is decreasing, the lift amount is selected as a master parameter so that the decreasing rate of the lift amount is faster than the increasing rate of the compression ratio Cr. The desired lift amount Lift_cmd is set so that the actual intake air amount converges to the desired intake air amount. The variable lift mechanism 26 acts so that the actual lift amount Lift reaches the desired lift amount Lift_cmd. The desired phase Cain_cmd and the desired compression ratio Cr_cmd are set based on the actual lift amount Lift that has been achieved by the variable lift mechanism 26. The variable phase mechanism 27 acts so that the actual phase Cain reaches the desired phase Cain_cmd and the variable compression ratio mechanism 25 acts so that the actual compression ratio Cr reaches the desired compression ratio Cr_cmd.

Mode 2 represents a mode where the engine load is extremely low and the requested driving force is decreasing. The compression ratio is controlled to become high, the lift amount is controlled to decrease and the phase is controlled to be advanced. Since the engine load is extremely low, the phase is selected as a master parameter. The lift amount is controlled to follow the phase and the compression ratio is controlled to follow the lift amount, so that the decreasing rate of the lift amount is faster than the increasing rate of the compression ratio. The desired phase Cain_cmd is set so that the actual intake air amount converges to the desired intake air amount. The variable phase mechanism 27 acts so that the actual phase Cain reaches the desired phase Cain_cmd. The desired lift amount Lift_cmd is set based on the actual phase Cain that has been achieved by the variable phase mechanism 27. The variable lift mechanism 26 acts so that the actual lift amount Lift reaches the desired lift amount Lift_cmd. Then, the desired compression ratio Cr_cmd is set based on the actual lift amount Lift that has been achieved by the variable lift mechanism 26. The variable compression ratio mechanism 25 acts so that the actual compression ratio Cr reaches the desired compression ratio Cr_cmd.

FIG. 5 is a summary table showing a rule for determining the master and slave parameters in the above-described Mode 1 through Mode 4.

Figure 6:
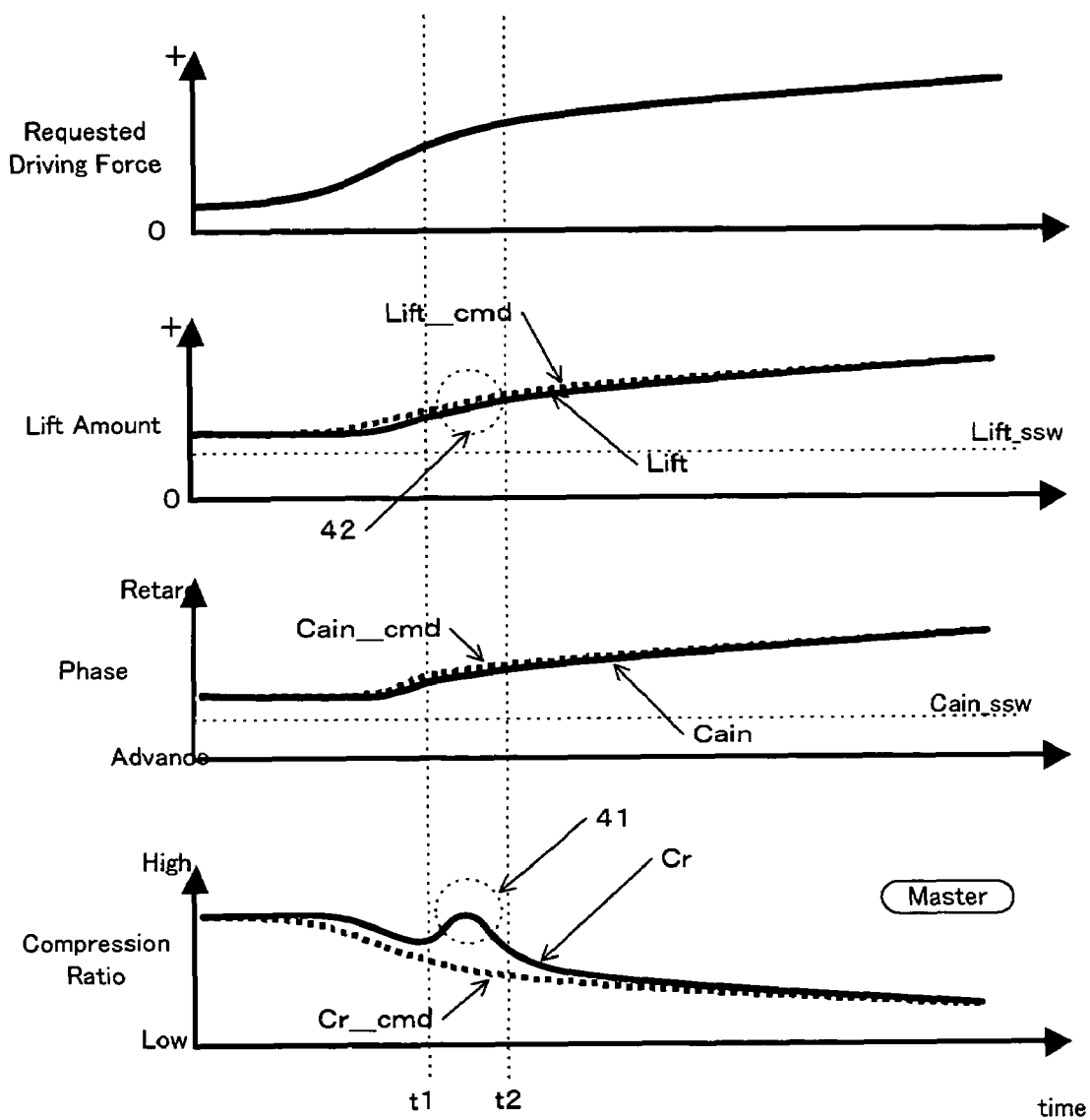
FIG. 6 shows a case in which slave parameters are controlled based on a desired value of a master parameter.
Figure 7:
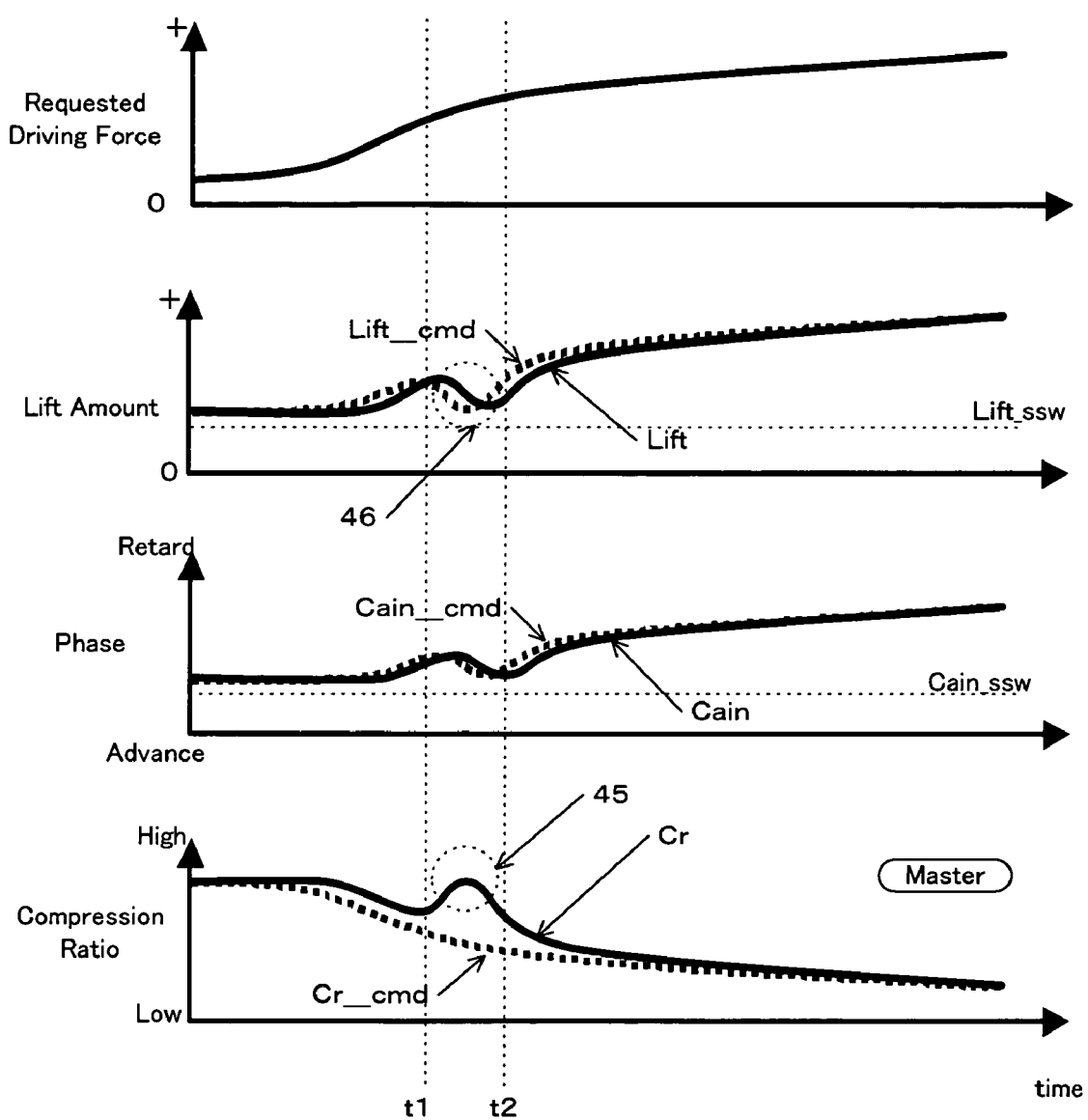
FIG. 7 shows a case in which slave parameters are controlled based on an actual measured value of a master parameter in accordance with one embodiment of the present invention.

It should be noted that the desired value of the slave parameter is determined not by the desired value of the master parameter but by the actual measured value of the master parameter. An effect of such arrangement will be described referring to FIGS. 6 and 7. In FIGS. 6 and 7, a solid line indicates an actual measured value and a dotted line indicates a desired value.

FIG. 6 shows a case in which the desired value of the slave parameter is determined based on the desired value of the master parameter. In this example, the master parameter is the compression ratio. The slave parameters are the lift amount and the phase. The desired compression ratio Cr_cmd is determined to achieve the desired requested driving force. The desired lift amount Lift_cmd is determined based on the desired compression ratio Cr_cmd.

Disturbance is applied during a period from time t1 to time t2. The disturbance causes a condition where the actual compression ratio Cr cannot follow the desired value Cr_cmd (see area 41). The actual compression ratio Cr is higher than the desired value Cr_cmd.

The desired lift amount Lift_cmd is determined based on the desired compression ratio Cain_cmd. The actual lift amount Lift is controlled to converge to the desired lift amount Lift_cmd. As a result, the lift amount is high under a high compression ratio as indicated by area 42, which causes a collision between the valve and the piston. Thus, if the desired value of the slave parameter is determined based on the desired value of the master parameter, the piston and the valve may collide with each other when disturbance is applied.

FIG. 7 shows a case in which the desired value of the slave parameter is determined based on an actual measured value of the master parameter. Disturbance is applied during a period from time t1 to time t2. The desired compression ratio Cr_cmd is determined to achieve the requested driving force.

The desired lift amount Lift_cmd is determined based on the actual measured compression ratio Cr.

The applied disturbance causes a condition where the actual compression ratio Cr is higher than the desired value Cr_cmd (see area 45). Since the desired lift amount Lift_cmd is determined based on the detected actual compression ratio Cr, the lift amount becomes low under a high compression ratio, which does not cause a collision between the valve and the piston (see area 46).

Thus, by determining the desired value of the slave parameter based on the actual measured value of the master parameter, a collision between the valve and the piston can be avoided even when an error occurs between the actual measured value and the desired value for the master parameter.

Master-slave Control Unit

Figure 8:
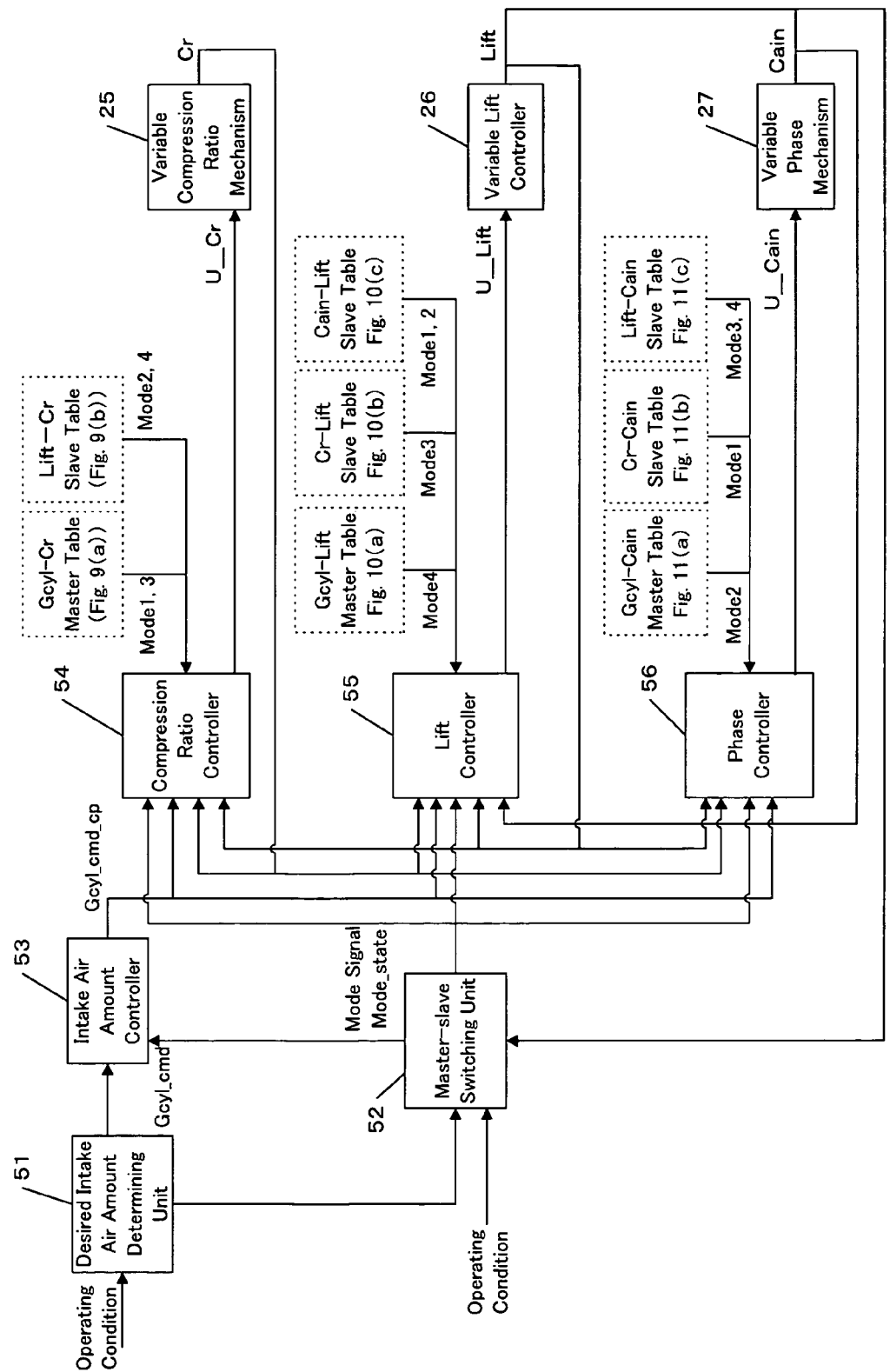
FIG. 8 shows a block diagram of a control apparatus in accordance with one embodiment of the present invention.

FIG. 8 shows a block diagram of a master-slave control unit in accordance with one embodiment of the present invention. Functions of each block are typically implemented by one or more programs stored in the memory 1c. Alternatively, these functions may be implemented by any kind of hardware.

A desired intake air amount determining unit 51 determines a desired intake air amount Gcyl_cmd based on the operating condition of the engine. The desired intake air amount Gcyl_cmd can be determined, for example, based on the vehicle speed NE, the accelerator pedal opening angle AP, and the transmission gear ratio SFT.

A master-slave switching unit 52 selects one of the modes 1 to 4 based on the increase/decrease of the requested driving force and the engine load according to the rule shown in FIG. 5. The master-slave switching unit 52 outputs a mode signal Mode_state indicating the selected mode.

In this embodiment, the master-slave switching unit 52 determines whether the requested driving force is increasing or decreasing based on changes in the desired intake air amount Gcyl_cmd. Further, in this embodiment, the actual phase and the actual lift amount are used so as to determine the magnitude of the engine load. Alternatively, any other parameters regarding the operating condition of the engine may be used to determine whether the requested driving force is increasing or decreasing, and determine the magnitude of the engine load.

The master and slave parameters are determined based on the selected mode. In the following description, among a compression ratio controller 54, a lift controller 55 and a phase controller 56, a controller for controlling the master parameter will be referred to as a master controller and the other controllers for controlling the slave parameters will be referred to as a slave controller.

An intake air amount controller 53 calculates a correction value Gcyl_cmd_cp for causing the air amount Gcyl that is actually taken into the engine to converge to the desired intake air amount Gcyl_cmd. This correction value is a control input into the master controller.

It is preferable that the mode signal Mode_state is delivered to the intake air amount controller 53 as shown in FIG. 8. The controller 53 can change a speed that the actual intake air amount Gcyl converges to the desired intake air amount Gcyl_cmd, depending on the selected mode.

The mode signal Mode_state is also sent to each of the controllers 54 to 56. A case when the mode signal Mode_state having a value of 1 is delivered from the switching unit 52 will be first described. The master parameter in Mode 1 is the compression ratio. The compression ratio controller 54 refers to Gcyl-Cr master table based on the correction value Gcyl_cmd_cp to determine the desired compression ratio Cr_cmd. An example of the Gcyl-Cr master table is shown in FIG. 9(a). The compression ratio controller 54 calculates a command value U_Cr that is to be used for driving the variable compression ratio mechanism 25 so that the actual compression ratio Cr converges to the desired compression ratio Cr_cmd.

The phase controller 56 receives the compression ratio Cr acquired as a result of driving the variable compression ratio mechanism 25 in accordance with the command value U_Cr. The phase controller 56 refers to Cr-Cain table based on the actual compression ratio Cr to determine the desired phase Cian_cmd. An example of the Cr-Cain table is shown in FIG. 11(b). The phase controller 56 calculates a command value U_Cain that is to be used for driving the variable phase mechanism 27 so that the actual phase Cain converges to the desired phase Cain_cmd.

The lift controller 55 receives the phase Cain acquired as a result of driving the variable phase mechanism 27 in accordance with the command value U_Cain. The lift controller 55 refers to Cain-Lift table based on the actual phase Cain to determine the desired lift amount Lift_cmd. An example of the Cain-Lift table is shown in FIG. 10(c). The lift controller 55 calculates a command value U_Lift that is to be used for driving the variable lift mechanism 26 so that the actual lift amount Lift converges to the desired lift amount Lift_cmd.

Thus, a control as shown in Mode 1 of FIGS. 4 and 5 is achieved.

Next, a case when the mode signal Mode_state having a value of 2 is delivered from the switching unit 52 will be described. The master parameter in Mode 2 is the phase. The phase controller 56 refers to Gcyl-Cain master table based on the correction value Gcyl_cmd_cp to determine the desired phase Cain_cmd. An example of the Gcyl-Cain master table is shown in FIG. 11(a). The phase controller 56 calculates a command value U_Cain that is to be used for driving the variable phase mechanism 27 so that the actual phase Cain converges to the desired phase Cain_cmd.

The lift controller 55 receives the phase Cain acquired as a result of driving the variable phase mechanism 27 in accordance with the command value U_Cain. The lift controller 55 refers to Cain-Lift table based on the actual phase Cain to determine the desired lift amount Lift_cmd. An example of the Cain-Lift table is shown in FIG. 10(c). The lift controller 55 calculates a command value U_Lift that is to be used for driving the variable lift mechanism 26 so that the actual lift amount Lift converges to the desired lift amount Lift_cmd.

The compression ratio controller 54 receives the lift amount Lift acquired as a result of driving the variable lift mechanism 26 in accordance with the command value U_Lift. The compression ratio controller 54 refers to Lift-Cr table based on the actual lift amount Lift to determine the desired compression ratio Cr_cmd. An example of the Lift-Cr table is shown in FIG. 9(b). The compression ratio controller 64 calculates a command value U_Cr that is to be used for driving the variable compression ratio mechanism 25 so that the actual compression ratio Cr converges to the desired compression ratio Cr_cmd.

Thus, a control as shown in Mode 2 of FIGS. 4 and 5 is achieved.

Next, a case when the mode signal Mode_state having a value of 3 is delivered from the switching unit 52 will be described. The master parameter in Mode 3 is the compression ratio. The compression ratio controller 54 refers to Gcyl-Cr master table based on the correction Gcyl_cmd_cp to determine the desired compression ratio Cr_cmd. An example of the Gcyl-Cr master table is shown in FIG. 9(a). The compression ratio controller 54 calculates a command value U_Cr that is to be used for driving the variable compression ratio mechanism 25 so that the actual compression ratio Cr converges to the desired compression ratio Cr_cmd.

The lift controller 55 receives the compression ratio Cr acquired as a result of driving the variable compression ratio mechanism 25 in accordance with the command value U_Cr. The lift controller 55 refers to Cr-Lift table based on the actual compression ratio Cr to determine the desired lift amount Lift_cmd. An example of a Cr-Lift table is shown in FIG.

10(b). The lift controller 55 calculates a command value U_Lift that is to be used for driving the variable lift mechanism 26 so that the actual lift amount Lift converges to the desired lift amount Lift_cmd.

The phase controller 56 receives the lift amount Lift acquired as a result of driving the variable lift mechanism 26 in accordance with the command value U_Lift. The phase controller 56 refers to Lift-Cain table based on the actual lift amount Lift to determine the desired phase Cain_cmd. An example of the Lift-Cain table is shown in FIG. 11(c). The phase controller 56 calculates a command value U_Cain that is to be used for driving the variable phase mechanism 27 so that the actual phase Cain converges to the desired phase Cain_cmd.

Thus, a control as shown in Mode 3 of FIGS. 4 and 5 is achieved.

A case when the mode signal Mode_state having a value of 4 is delivered from the switching unit 52 will be described. The master parameter in Mode 4 is the lift amount.

The lift controller 55 refers to Gcyl-Lift master table based on the correction value Gcyl_cmd_cp to determine the desired lift amount Lift_cmd. An example of the Gcyl-Lift master table is shown in FIG. 10(a). The lift controller 55 calculates a command value U_Lift that is to be used for driving the variable lift mechanism 26 so that the actual lift amount Lift converges to the desired lift amount Lift_cmd.

The phase controller 56 receives the lift amount Lift acquired as a result of driving the variable lift mechanism 26 in accordance with the command value U_Lift. The phase controller 56 refers to Lift-Cain table based on the actual lift amount Lift to determine the desired phase Cain_cmd. An example of the Lift-Cain table is shown in FIG. 11(c). The phase controller 56 calculates a command value U_Cain that is to be used for driving the variable phase mechanism 27 so that the actual phase Cain converges to the desired phase Cain_cmd.

The compression ratio controller 54 receives the lift amount Lift acquired as result of driving the variable lift mechanism 26 in accordance with the command value U_Lift. The compression ratio controller 54 refers to Lift-Cr table based on the actual lift amount Lift to determine the desired compression ratio Cr_cmd. An example of the Lift-Cr table is shown in FIG. 9(b). The compression ratio controller 54 calculates a command value U_Cr that is to be used for driving the variable compression ratio mechanism 25 so that the actual compression ratio Cr converges to the desired compression ratio Cr_cmd.

Thus, a control shown in Mode 4 of FIGS. 4 and 5 is achieved.

Each of the blocks as shown in FIG. 8 will be described below.

Intake Air Amount Controller

The intake air amount controller 53 calculates the above-described correction value Gcyl_cmd_cp, which is a control input into the master controller selected by the master-slave switching unit 52. The calculation method for the control input will be described.

Considering the dynamic characteristics of the intake air amount of the engine, the intake air amount Gcyl(n) in the current cycle is determined depending on the past intake air amounts Gcyl(n−1) and Gcyl(n−2), as expressed by the equation (1). "n" represents an identifier for identifying an operation cycle in which the calculation by the intake air amount controller 53 is carried out.

$$Gcyl(n)=Ag1i \cdot Gcyl(n-1)+Ag2i \cdot Gcyl(n-2)+ Bg1i \cdot Gcyl\_cmd\_cp(n-dgi) \quad (1)$$

Gcyl indicates the intake air amount detected by the airflow meter 20 (FIG. 1). "dgi" indicates a dead time from the time at which the correction value Gcyl_cmd_cp has been input to the master controller to the time at which air amount that reflects the correction value Gcyl_cmd_cp is actually taken into the engine. Ag1i, Ag2i and Bg1i are model parameters.

The transfer function for the controlled object of the intake air amount controller 53 may be different depending on which controller is selected as a master. Therefore, it is preferable that the value of the dead time and the values of the model parameters are determined in accordance with the selected mode. In this embodiment, a character "i" contained in the dgi, Ag1i, Ag2i and Bg1i indicates the selected mode's number. For example, dg1, Ag11, Ag21 and Bg11 represent the dead time and the model parameters for Mode 1.

Figure 12:
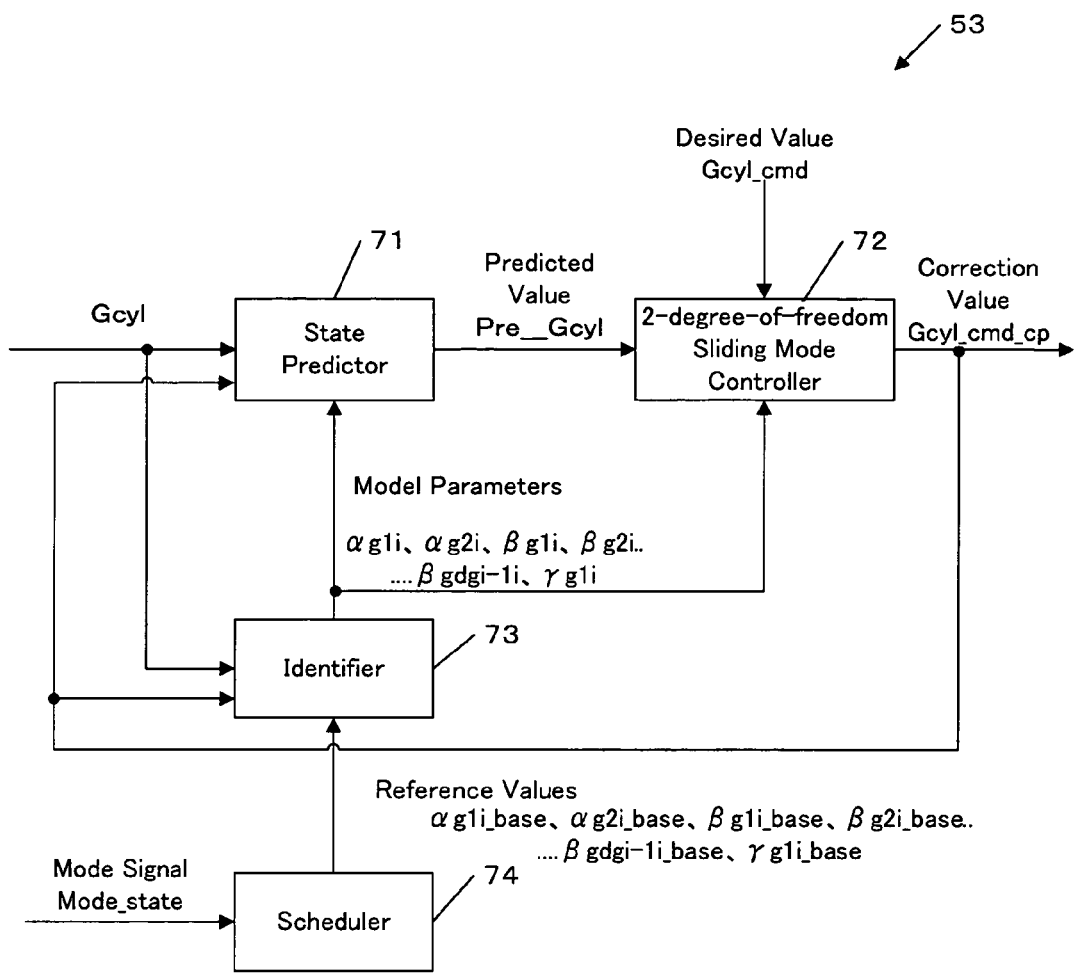
FIG. 12 shows a block diagram of an intake air amount controller in accordance with one embodiment of the present invention.

FIG. 12 shows a detailed block diagram of the intake air amount controller. A state predictor 71 calculates a predicted value Pre_Gcyl of the intake air amount based on the detected intake air amount Gcyl so as to compensate for the above-described dead time. A 2-degree-of-freedom sliding mode controller 72 performs a response assignment control to calculate a control input Gcyl_cmd_cp so that the predicted value Pre_Gcyl converges to a desired value Gcyl_cmd (more exactly, Gcyl_cmd_f, as will be described later). An identifier 73 recursively identifies the model parameters Ag1i, Ag2i and Bg1i which are included in the equation (1) (more exactly, parameters αg1i, αg2i, βg1i, ... γg1i based on the model parameters Ag1i, Ag2i and Bg1i, as will be described later). Reference values are used so as to identify the model parameters Ag1i, Ag2i and Bg1i. The reference values, which are prepared for each mode, are stored in advance in the memory 1c. A scheduler 74 extracts reference values for the selected mode in accordance with the value indicated by the mode signal Mode_state and delivers the reference values to the identifier 73.

Details of each block will be described. At first, the state predictor 71 will be described.

The value that is required for compensating for the dead time dgi in the equation (1) is Gcyl(n+dgi−1). So, the model equation (1) expressing the dynamic characteristics of the intake air amount is shifted by (dgi−1) steps to the future.

$$Gcyl(n+dgi-1)=Ag1i \cdot Gcyl(n+dgi-2)+Ag2i \cdot Gcyl(n+ dgi-3)+Bg1i \cdot Gcyl\_cmd\_cp(n-1) \quad (2)$$

Since the equation (2) includes future values Gcyl(n+dgi−2) and Gcyl(n+dgi−3), which cannot be observed, these future values should be deleted. Such deletion can be achieved through recursive calculation as shown in the following. The equation (3) represents the prediction equation for the intake air amount Gcyl.

$$\begin{aligned}
Gcyl(n+1) &= Ag1i \cdot Gcyl(n) + Ag2i \cdot Gcyl(n-1) + \\
&\quad Bg1i \cdot Gcyl\_cmd\_cp(n-dgi+1)(a) \\
&\Downarrow \\
Gcyl(n+2) &= Ag1i \cdot Gcyl(n+1) + Ag2i \cdot Gcyl(n) + \\
&\quad Bg1i \cdot Gcyl\_cmd\_cp(n-dgi+2) \\
&\Downarrow \text{ substitute the above } (a) \text{ into } Gcyl(n+1) \\
Gcyl(n+2) &= Ag1i \cdot (Ag1i \cdot Gcyl(n) + Ag2i \cdot Gcyl(n-1) + \\
&\quad Bg1i \cdot Gcyl\_cmd\_cp(n-dgi+1)) + \\
&\quad Ag2i \cdot Gcyl(n) + Bg1i \cdot Gcyl\_cmd\_cp(n-dgi+2) \\
&= (Ag1i^2 + Ag2i) \cdot Gcyl(n) + Ag1i \cdot Ag2i \cdot \\
&\quad Gcyl(n-1) + \\
&\quad Bg1i \cdot Gcyl\_cmd\_cp(n-dgi+2) + \\
&\quad Ag1i \cdot Bg1i \cdot Gcyl\_cmd\_cp(n-dgi+1) \\
&\cdots \\
&\Downarrow
\end{aligned} \quad (3)$$

-continued
$$Gcyl(n+dgi-1) = \alpha_{g1i} \cdot Gcyl(n) + \alpha_{g2i} \cdot Gcyl(n-1) + \\ + \beta_{g1i} \cdot Gcyl\_cmd\_cp(n-1) + \beta_{g2i} \cdot \\ Gcyl\_cmd\_cp(n-2) +, \ldots, + \\ \beta_{gdgi-1i} \cdot Gcyl\_cmd\_cp(n-dgi+1)$$

An estimated disturbance γg1i for compensating for a modeling error and a prediction error is included in the prediction equation (3). The equation (4) is performed by the state predictor 71 to determine a predicted value Pre_Gcyl. It should be noted that a character "i" in the model parameters αg1i, αg2i, βg1i, . . . γg1i also indicates the mode number.

$$Pre\_Gcyl(n) = Gcyl(n+dgi-1) \quad (4)$$
$$= \alpha_{g1i}(n) \cdot Gcyl(n) + \alpha_{g2i}(n) \cdot Gcyl(n-1) + \\ \beta_{g1i}(n) \cdot Gcyl\_cmd\_cp(n-1) + \beta_{g2i}(n) \cdot \\ Gcyl\_cmd\_cp(n-2) +, \ldots, + \\ \beta_{gdgi-1i}(n) \cdot Gcyl\_cmd\_cp(n-dgi+1) + \\ \gamma_{g1i}(n)$$

Next, the 2-degree-of-freedom sliding mode controller 72 will be described.

The 2-degree-of-freedom sliding mode controller 72 uses a 2-degree-of-freedom sliding mode control to calculate the control input Gcyl_cmd_cp. The sliding model control is a response assignment control that is capable of specifying a convergence speed of a controlled variable to a desired value. The 2-degree-of-freedom sliding mode control is an extended version of the sliding mode control. According to the 2-degree-of-freedom sliding mode control, a speed that a controlled variable follows a desired value and a speed that the controlled variable converges when disturbance is applied can be separately specified. The former is called a desired value response assignment parameter POLEgc_fi and the latter is called a disturbance suppression response assignment parameter POLEgci.

A first-order delay filter (low-pass filter) is applied to the desired value Gcyl_cmd by using the desired value response assignment parameter POLEgc_fi according to the equation (5). The desired value response assignment parameter POLEgc_fi is set to satisfy −1<POLEgc_fi<0.

$$Gcyl\_cmd\_f(n) = -POLEgc\_fi \cdot Gcyl\_cmd\_f(n-1) + \\ (1+POLEgc\_fi) \cdot Gcyl\_cmd(n) \quad (5)$$

As shown in the equation (5), the trajectory of the desired value Gcyl_cmd is corrected by the value of the desired value response assignment parameter POLEgc_fi to establish a new desired value Gcyl_cmd_f. Then, the control input Gcyl_cmd_cp is calculated so that the predicted value Pre_Gcyl converges to this new desired value Gcyl_cmd_f. Depending on how the trajectory of the desired value Gcyl_cmd is corrected by the response assignment parameter POLEgc_fi, a speed that the predicted value Pre_Gcyl follows the desired value Gcyl_cmd_cp can be controlled.

A switching function σgc is defined so as to implement the 2-degree-of-freedom sliding mode control. Convergence behavior of an error between the predicted value Pre_Gcyl and the desired value Gcyl_cmd_f is specified by the switching function σgc. E_gc is the error between the predicted value Pre_Gcyl and the desired value Gcyl_cmd_f. In order to calculate an equivalent control input (which will be described later), the error is calculated by using the previous value Gcyl_cmd_f(n-1) of the desired value. The disturbance suppression response assignment parameter POLEgci is set to satisfy −1<POLEgci<0.

$$\sigma gc(n) = E\_gc(n) + POLEgci \cdot E\_gc(n-1) \text{ where } E\_gc \\ (n) = Pre\_Gcyl(n) - Gcyl\_cmd\_f(n-1) \quad (6)$$

The 2-degree-of-freedom sliding mode controller 72 determines the control input Gcyl_cmd_cp so that the switching function σgc becomes zero as expressed in the equation (7).

$$\sigma gc(n) = 0 \quad (7)$$
$$\Downarrow$$
$$E\_gc(n) = -POLEgci \cdot E\_gc(n-1)$$

The equation (7) represents a first-order delay system having no input. In other words, the sliding mode controller 72 controls the error or the controlled variable E_gc so that the controlled variable E_gc is confined within the first-order delay system shown in the equation (7).

Figure 13:
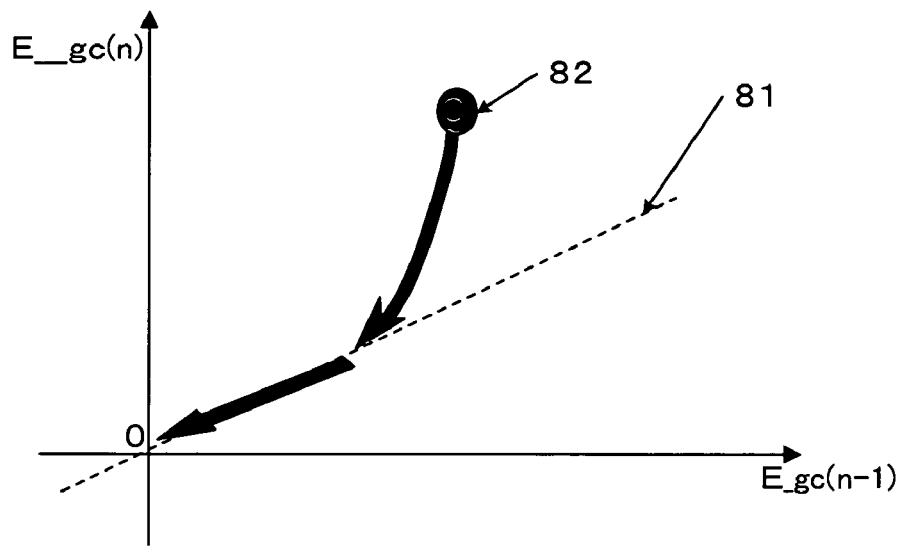
FIG. 13 shows how a controlled variable converges in a response assignment control in accordance with one embodiment of the present invention.

FIG. 13 shows a phase plane with E_gc(n) on the vertical axis and E_gc(n−1) on the horizontal axis. A switching line 81 expressed by the equation (7) is shown in the phase plane. Assuming that a point 82 is an initial value of a state quantity (E_gc(n−1), E_gc(n)), the sliding mode controller 72 places the state quantity on the switching line 81 and then confines it on the switching line 81. Since the state quantity is confined within the first-order delay system having no input, the state quantity automatically converges to the origin of the phase plane (that is, (E_gc(n−1), E_gc(n)=0) with time. By confining the state quantity on the switching line 81, the state quantity can converge to the origin without being affected by disturbance.

Figure 14:
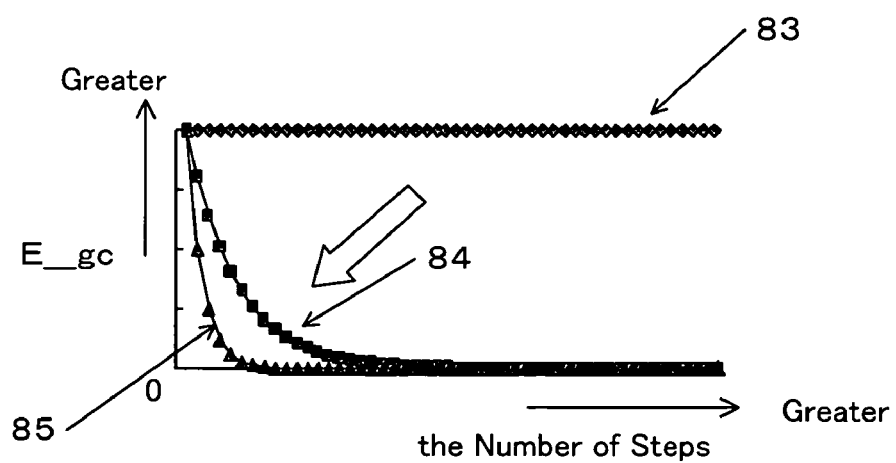
FIG. 14 shows a convergence speed in accordance with a response assignment parameter in a response assignment control in accordance with one embodiment of the present invention.

Referring to FIG. 14, reference numbers 83, 84 and 85 show a convergence speed of the error E_gc in the cases where the disturbance suppression response assignment parameter POLEgci takes a value of −1, −0.8 or −0.5, respectively. The convergence speed of the error E_gc increases as the absolute value of the response assignment parameter POLEgci decreases.

The sliding mode controller 72 calculates the control input Gcyl_cmd_cp in accordance with the equation (8). An equivalent control input Ueq_gc is an input for confining the state quantity on the switching line. A reaching law input Urch_gc is an input for placing the state quantity on the switching line.

$$Gcyl\_cmd\_cp(n) = Ueq\_gc(n) + Urch\_gc(n) \quad (8)$$

A method for determining the equivalent control input Ueq_gc will be described. The equivalent control input Ueq_gc has a function for holding the state quantity at an arbitrary position in the phase plane. Therefore, the equivalent control input is required to satisfy the equation (9).

$$\sigma gc(n+1) = \sigma gc(n) \quad (9)$$

Based on the equation (9) and the above-described prediction equation (4), the equivalent control input Ueq_gc is determined according to the equation (10).

$$Ueq\_gc(n) = Gcyl\_cmd\_cp(n) \quad (10)$$
$$= \frac{1}{\beta_{g1i}(n)} \{POLEgci \cdot Pre\_Gcyl(n-1) +$$

-continued $$(1 - POLEgci) \cdot \text{Pre\_Gcyl}(n) - \alpha_{g1i}(n)$$
$$\text{Pre\_Gcyl}(n - dgi + 2) - \alpha_{g2i}(n)\text{Pre\_Gcyl}$$
$$(n - dgi + 1) - \beta_{g2i}(n)\text{Gcyl\_cmd\_cp}$$
$$(n - 1) - \ldots - \beta_{gdgi-1i}(n)\text{Gcyl\_cmd\_cp}$$
$$(n - dgi + 2) - \gamma_{g1i}(n) + \text{Gcyl\_cmd\_f}(n) +$$
$$(POLEgci - 1)\text{Gcyl\_cmd\_f}(n - 1) -$$
$$POLEgci \cdot \text{Gcyl\_cmd\_f}(n - 2)\}$$

A reaching law input Urch_gc is calculated in accordance with the equation (11). Krchgci indicates a feedback gain. The value of the feedback gain Krchgci is identified through simulation or the like in consideration of the stability, the responsivity or the like of the controlled variable.

$$\text{Urch\_gc}(n) = \frac{-Krchgci}{\beta_{g1i}(n)} \sigma gc(n) \tag{11}$$

Thus, the control input Gcyl_cmd_cp, which is a sum of the equivalent control input Ueq_gc and the reaching law input Urch_gc, is output from the intake air amount controller 53.

A character "i" in the desired value response assignment parameter POLEgc_fi, the disturbance suppression response assignment parameter POLEgci and the feedback gain Krchgci indicates the mode number. It is preferable that the values of these parameters are set according to the selected mode.

In this embodiment, the values of the desired value response assignment parameter POLEgc_fi, the disturbance suppression response assignment parameter POLEgci and the feedback gain Krchgci in each mode have the following relationship:

$$-1 < POLEgc\_f2 < POLEgc\_f1 < POLEgc\_f4 < POLEgc\_f3 < 0$$

$$-1 < POLEgc2 < POLEgc1 < POLEgc4 < POLEgc3 < 0$$

$$0 < Krchgc2 < Krchgc1 < Krchgc4 < Krchgc3$$

As can be seen from the above relationship, the convergence speed of the controlled variable is set to increase in the order of Mode 3, Mode 4, Mode 1 and Mode 2. In other words, the convergence speed is set to be faster when the requested driving force is increasing than when the requested driving force is decreasing. Thus, when the requested driving force is increasing, the response of the intake air amount is increased, thereby improving the drivability. Further, the convergence speed is faster when the engine load is within a range from low to high than when the engine load is extremely low. Thus, the desired engine output is generated quickly when the engine is in the normal operating condition, and hence the drivability can be improved.

The magnitude of the dead time dgi is set to an appropriate value depending on the type of the master controller. In this embodiment, the dead time of each mode is set to satisfy the following relationship:

$$dg4 < dg2 < dg3 < dg1$$

Now, the identifier 73 will be described. The identifier 73 identifies the parameters αg1i, αg2i, βg1i, g2i, . . . gdgi-1i, γg1i in the equation (4). Since these parameters are based on the model parameters Ag1i, Ag2i and Bg1i of the model equation (1) as can be seen from the equation (3), the model parameters of the equation (1) can be identified by identifying these parameters.

The identification method may use a well-known technique such as least squares method and a maximum likelihood method. In one embodiment of the present invention, a delta (δ) correction method, which is a more efficient technique, is used. The detail of the delta correction method is described in Japanese Patent No. 3304845. A method for identifying these parameters by using the delta correction method will be briefly described.

A recursive identification algorithm according to the delta correction method is expressed as in the equation (12). A reference value θgc_base of a vector θgc(n) of the parameters that are to be identified is established in advance for each mode and stored in the memory 1c (a character "i" of each element of the reference value indicates the mode number). The scheduler 74 extracts a corresponding reference value θgc_base(n) from the memory 1c in accordance with the value of the mode signal Mode_state and delivers it to the identifier 73. The identifier 73 calculates the parameter vector θgc(n) by adding the reference value θgc_base(n) to its update component dθgc(n).

$$\theta gc(n) = \theta gc\_base(n) + d\theta gc(n) \tag{12}$$

$$d\theta gc(n) = \delta \cdot d\theta gc(n-1) + KPgc(n) \cdot \text{ide\_gc}(n) \tag{13}$$

where $\theta gc^T(n) = [\alpha_{g1i}(n), \alpha_{g2i}(n), \beta_{g1i}(n), \beta_{g2i}(n), \ldots ,$ (14)
$\beta_{gdgi-1i}(n), \gamma_{g1i}(n)]$ $d\theta gc^T(n) = [d\alpha_{g1i}(n), d\alpha_{g2i}(n), d\beta_{g1i}(n), d\beta_{g2i}(n), \ldots ,$ (15)
$d\beta_{gdgi-1i}(n), d\gamma_{g1i}(n)]$ $\theta gc\_base^T(n) = [\alpha_{g1i}\_base(n), \alpha_{g2i}\_base(n),$ (16)
$\beta_{g1i}(n)\_base(n), \beta_{g2i}\_base(n), \ldots ,$
$\beta_{gdgi-1i}\_base(n), \gamma_{g1i}\_base(n)]$ $$\delta = \begin{bmatrix} \delta_1 & 0 & 0 & \ldots & 0 \\ 0 & \delta_2 & 0 & \ldots & 0 \\ 0 & 0 & \delta_3 & \ldots & \ldots \\ \ldots & \ldots & \ldots & \ldots & 0 \\ 0 & 0 & \ldots & 0 & \delta_{dgi+2} \end{bmatrix} (0 < \delta_1, \delta_2, \ldots , \delta_{dgi+2} < 1) \tag{17}$$

δ is a forgetting coefficient vector, which is expressed in the equation (17). Each element δ1, δ2, . . . of the forgetting coefficient vector δ is set to a value more than 0 and less than 1. However, in order to make a steady-state error of the controlled variable with respect to the desired value zero, it is preferable that one of δ1, δ2, . . . is set to a value of 1.

In the δ correction method, an identification error ide_gc (n) included in the equation (13) is expressed by the equation (18). Gcyl_hat is calculated based on the prediction equation (4) and the previous value θgc(n−1) of the parameter vector. The identifier 73 determines the parameter vector θgc so that an error between the intake air amount Gcyl_hat calculated based on the prediction equation and the actual intake air amount Gcyl converges to zero (that is, so that the identification error ide_gc converges to zero).

$$\text{ide\_gc}(n) = \text{Gcyl\_hat}(n) - \text{Gcyl}(n) \tag{18}$$

where $\text{Gcyl\_hat}(n) = \theta gc^T(n-1) \cdot \zeta gc(n) \; \zeta gc^T(n) = [\text{Gcyl}$
$(n-dgi+1), \text{Gcyl}(n-dgi), \text{Gcyl\_cmd\_cp}(n-dgi),$
$\text{Gcyl\_cmd\_cp}(n-dgi-1), \ldots , \text{Gcyl\_cmd\_cp}$
$(n-2dgi+2), 1]$ (19)

The gain KPgc(n) included in the equation (13) is expressed by the equation (20).

$$KPgc(n) = \frac{P(n-1) \cdot \zeta(n)}{1 + \zeta^T(n) \cdot P(n-1) \cdot \zeta(n)} \quad (20)$$

$$P(n) = \frac{1}{\lambda 1}\left(I - \frac{\lambda 2 \cdot P(n-1) \cdot \zeta(n) \cdot \zeta^T(n)}{\lambda 1 + \lambda 2 \cdot \zeta^T(n) \cdot P(n-1) \cdot \zeta(n)}\right)P(n-1) \quad (21)$$

where $I$ is a unit matrix of $(3 \times 3)$

As shown in the equation (12), in the δ correction method, the parameter vector θgc(n) is expressed by a sum of the reference value θgc_base(n) and its update component d θgc (n). Since the model parameter vector θgc converges to the reference value θgc_base when a steady state of the controlled object continues, a drift of the parameter vector can be avoided.

Depending on the setting of the coefficients γ1 and γ2 of the equation (20), the type of the identification algorithm is determined as follows:
γ1=1 and γ2=0: fixed gain algorithm
γ1=1 and γ2=1: least squares algorithm
γ1=1 and γ2=γ: gradually decreasing gain algorithm (γ is a predetermined value other than 0 and 1)
γ1=γ and γ2=1: weighted least squares algorithm (γ is a predetermined value other than 0 and 1)

Structure of Each Controller

The compression ratio controller 54, the lift controller 55 and the phase controller 56 will be briefly described. The structure of each of these controllers is very similar to that of the intake air amount controller 53.

The compression ratio controller 54 calculates a command value U_Cr that is to be used for driving the variable compression ratio mechanism 25 so as to cause the compression ratio Cr to converge to the desired compression ratio Cr_cmd. As described above, in the case of Mode 1 and Mode 3 in which the compression ratio is selected as a master parameter, the compression ratio controller 54 determines the desired compression ratio Cr_cmd based on the correction value Gcyl_cmd_cp received from the intake air amount controller 53. In the case of Mode 2 and Mode 4, the compression ratio controller 54 determines the desired compression ratio Cr_cmd based on the actual lift amount Lift.

The dynamic characteristics of the compression ratio Cr can be modeled as shown in the equation (22). "k" indicates an identifier for identifying an operation cycle in which the calculation by the compression ratio controller 54 is carried out.

$$Cr(k)=A1cr \cdot Cr(k-1)+A2cr \cdot Cr(k-2)+B1cr \cdot U\_Cr(k-dcr) \quad (22)$$

"dcr" represents a dead time from the time at which the command value U_Cr from the compression ratio controller 54 has been input into the variable compression ratio mechanism 25 to the time at which the compression ratio based on the command value U_Crt is actually output. A1cr, A2cr and B1cr are model parameters.

Figure 15:
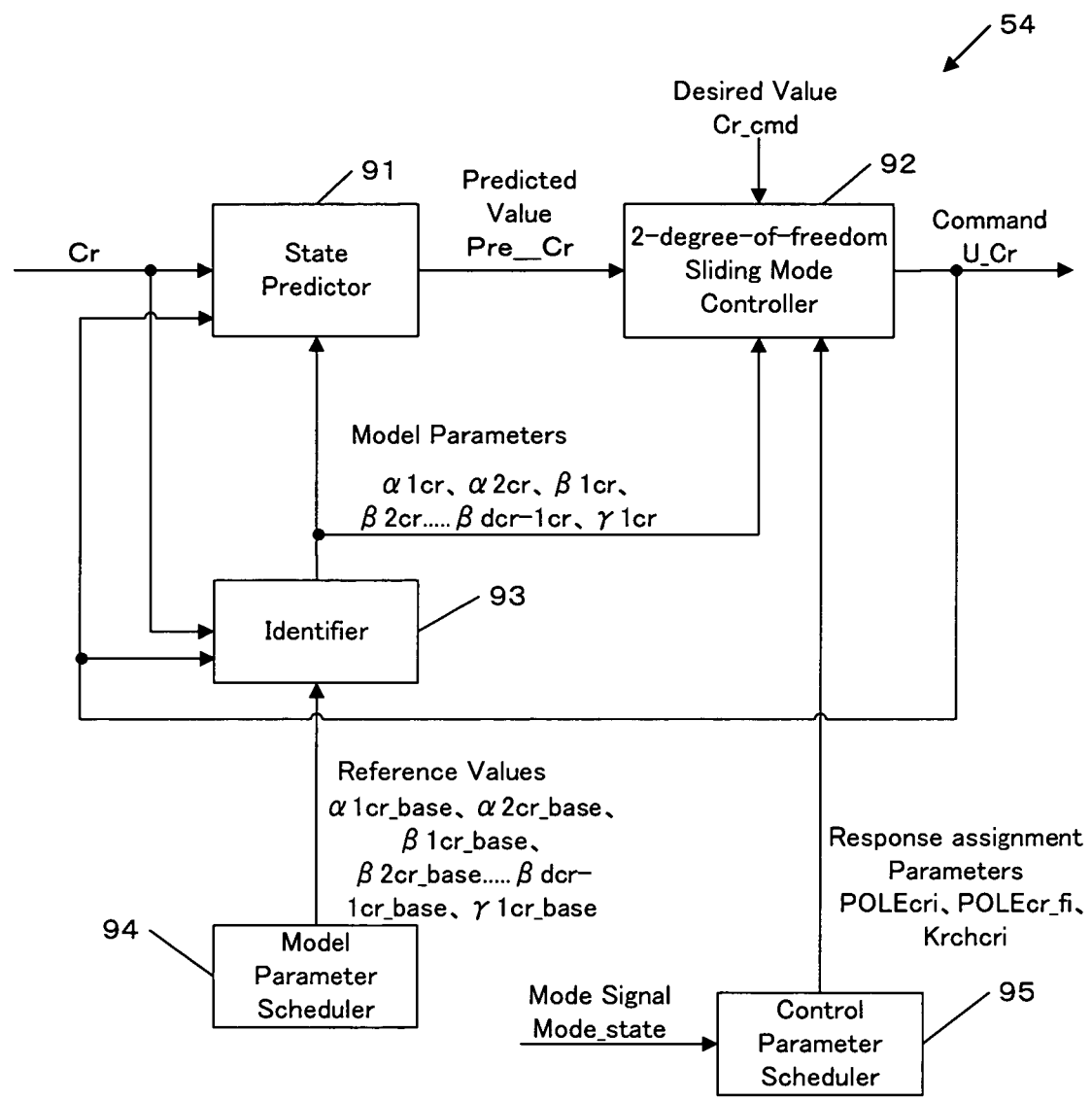
FIG. 15 shows a block diagram of a compression ratio controller in accordance with one embodiment of the present invention.

FIG. 15 shows a detailed block diagram of the compression ratio controller 54. A state predictor 91 calculates a predicted value Pre_Cr of the compression ratio based on the detected compression ratio Cr so as to compensate for the dead time dcr.

A desired value response assignment parameter POLEcr_fi, a disturbance suppression response assignment parameter POLEcri and a feedback gain Krchcri for each mode are stored in the memory 1c. A character "i" included in the notation of these parameters indicates the mode number. A controller parameter scheduler 95 receives the signal Mode_state indicating the selected mode, extracts corresponding parameters from the memory 1c in accordance with the value of the mode signal and delivers them to a 2-degree-of-freedom sliding mode controller 92.

The 2-degree-of-freedom sliding mode controller 92 refers to a table (FIGS. 9(a) or 9(b)) in accordance with the received signal Mode_state to determine the desired value Cr_cmd. The 2-degree-of-freedom sliding mode controller 92 uses the desired value response assignment parameter POLEcr_fi, the disturbance suppression response assignment parameter POLEcri and the feedback gain Krchcri received from the controller parameter scheduler 95 to perform the above described response assignment control. The 2-degree-of-freedom sliding mode controller 92 calculates a control input U_Cr so that the predicted value Pre_Cr converges to the desired value Cr_cmd (more exactly, Cr_cmd_f, as will be described later).

As with the identifier 73 of the intake air amount controller 53, an identifier 93 recursively identifies the model parameters A1cr, A2cr and B1cr which are included in the equation (22) (more exactly, parameters α1cr, α2cr, β1cr, . . . γ1cr based on the model parameters A1cr, A2cr and B1cr, as will be described later). Reference values are used so as to identify the parameters A1cr, A2cr and B2cr. The reference values, which are prepared for each mode, are stored in advance in the memory 1c. A model parameter scheduler 94 extracts these reference values and delivers them to the identifier 93.

Now, calculations performed by each block of the figure will be described. A state predictor 91 calculates the predicted value Pre_Cr, as with the state predictor 71 of the intake air amount controller 53. The calculation is shown by the equation (23).

$$\begin{aligned}Pre\_Cr(k) &= Cr(k+dcr-1) \\ &= \alpha_{1cr}(k) \cdot Cr(k) + \alpha_{2cr}(k) \cdot Cr(k-1) + \\ &\quad \beta_{1cr}(k) \cdot U\_Cr(k-1) + \beta_{2cr}(k) \cdot \\ &\quad U\_Cr(k-2) +, \ldots, +\beta_{dcr-1cr}(k) \cdot \\ &\quad U\_Cr(k-dcr+1) + \gamma_{1cr}(k)\end{aligned} \quad (23)$$

The 2-degree-of-freedom sliding mode controller 92 applies a first-order delay filter (low-pass filter) to the desired value Cr_cmd by using the desired value response assignment parameter POLEcr_fi received from the scheduler 95 according to the equation (24). The desired value response assignment parameter POLEcr_fi is set to satisfy −1<POLEcr_fi<0.

$$Cr\_cmd\_f(k)=-POLEcr\_fi \cdot Cr\_cmd\_f(k-1)+(1+POLEcr\_fi) \cdot Cr\_cmd(k) \quad (24)$$

The 2-degree-of-freedom sliding mode controller 92 defines a switching function σcr as expressed in the equation (25). E_cr represents an error between the predicted value Pre_Cr and the desired value Cr_cmd. The disturbance suppression response assignment parameter POLEcri is set to satisfy −1<POLEcri<0.

$$\sigma cr(k)=E\_cr(k)+POLEcri\ E\_cr(k-1) \text{ where } E\_cr(k)=Pre\_Cr(k)-Cr\_cmd\_f(k-1) \quad (25)$$

The 2-degree-of-freedom sliding mode controller 92 determines a control input U_Cr so that the switching function σcr becomes zero. The control input U_Cr is calculated in accordance with the equation (26). Ueq_cr is an equivalent control input, which is an input for confining the state quantity on the switching line. Urch_cr is a reaching law input, which is an input for placing the state quantity on the switching line.

$$U\_Cr(k)=Ueq\_cr(k)+Urch\_cr(k) \quad (26)$$

The equivalent control input Ueq_cr is calculated as shown in the equation (27).

$$\mathrm{Ueq\_cr}(k) = \frac{1}{\beta 1 cr(k)} \{ POLEcri \cdot \mathrm{Pre\_Cr}(k-1) + \quad (27)$$
$$(1 - POLEcri) \cdot \mathrm{Pre\_Cr}(k) - \alpha_{1cr}(k)$$
$$\mathrm{Pre\_Cr}(k - dcr + 2) - \alpha_{2cr}(n)\mathrm{Pre\_Cr}$$
$$(k - dcr + 1) - \beta_{2cr}(k)\mathrm{U\_Cr}(k-1) - \ldots -$$
$$\beta_{dcr-1cr}(k)\mathrm{U\_Cr}(k - dcr + 2) - \gamma_{1cr}(k) +$$
$$\mathrm{Cr\_cmd\_f}(k) + (POLEcri - 1)$$
$$\mathrm{Cr\_cmd\_f}(k-1) - POLEcri \cdot$$
$$\mathrm{Cr\_cmd\_f}(k-2) \}$$

The reaching law input Urch_cr is calculated in accordance with the equation (28). Krchcri represents a feedback gain. The value of the feedback gain Krchcri is identified through simulation or the like in consideration of the stability, the responsiveness or the like of the controlled variable.

$$\mathrm{Urch\_cr}(k) = \frac{-Krchcri}{\beta_{1cr}(k)} \sigma cr(k) \quad (28)$$

Thus, the control input U_Cr, which is a sum of the equivalent control input Ueq_cr and the reaching law input Urch_cr, is output from the compression ratio controller 54 to the variable compression ratio mechanism 25.

Preferably, the values of the desired value response assignment parameter POLEcr_fi, the disturbance suppression response assignment parameter POLEcri and the feedback gain Krchcri in each mode have the following relationship:

$-1 < POLEcr\_f2, POLEcr\_f4 < POLEcr\_f1,$
$POLEcr\_f3 < 0$ $-1 < POLEcr2, POLEcr4 < POLEcr1, POLEcr3 < 0$ $0 < Krchcr2, Krchcr4 < Krchcr1, Krchcr3$ As can been seen from the above relationship, these parameters are defined so that the convergence speed of the controlled variable E_cr is faster in Mode 1 and Mode 3 in which the compression ratio is selected as a master parameter than in Mode 2 and Mode 4 in which the compression ratio is selected as a slave parameter. The parameter values thus defined allows the master parameter to converge more quickly than the slave parameters.

As described above, by causing the slave parameters to follow the actual measured value of the master parameter, a changing rate of the master parameter becomes faster than a changing rate of the slave parameters. In addition to such a master-slave control, the convergence speed of the master parameter is controlled to be faster than the convergence speed of the slave parameters by virtue of the desired value response assignment parameter, the disturbance suppression response assignment parameter and the feedback gain, so that it is more surely prevented that the slave parameters outpace the master parameter.

Next, the identification method will be described. The model parameter scheduler 94 extracts from the memory 1c the reference value θcr_base(k) of the parameter vector θcr (k) that is to be identified and delivers it to the identifier 93. The identifier 93 identifies the parameter vector θcr in a similar way to the identifier 73 of the intake air amount controller 53. The identification is performed according to the following equations (29) to (34):

$$\theta cr(k) = \theta cr\_base(k) + d\theta cr(k) \quad (29)$$

$$d\theta cr(k) = \delta \cdot d\theta cr(k-1) + KPcr(k) \cdot \mathrm{ide\_cr}(k) \quad (30)$$

where $$\theta cr^T(k) = [\alpha_{1cr}(k), \alpha_{2cr}(k), \beta_{1cr}(k), \beta_{2cr}(k), \ldots \beta_{dcr-1cr}(k), \gamma_{1cr}(k)] \quad (31)$$

$$d\theta cr^T(k) = [d\alpha_{1cr}(k), d\alpha_{2cr}(k), d\beta_{1cr}(k), d\beta_{2cr}(k), \ldots d\beta_{dcr-1cr}(k), d\gamma_{1cr}(k)] \quad (32)$$

$$\theta cr\_base^T(k) = [\alpha_{1cr\_base}(k), \alpha_{2cr\_base}(k), \beta_{1cr\_base}(k), \quad (33)$$
$$\beta_{2cr\_base}(k), \ldots \beta_{dcr-1cr\_base}(k), \gamma_{1cr\_base}(k)]$$

$$\delta = \begin{bmatrix} \delta_1 & 0 & 0 & \ldots & 0 \\ 0 & \delta_2 & 0 & \ldots & 0 \\ 0 & 0 & \delta_3 & \ldots & \ldots \\ \ldots & \ldots & \ldots & \ldots & 0 \\ 0 & 0 & \ldots & 0 & \delta_{dcr+2} \end{bmatrix} (0 < \delta_1, \delta_2, \ldots \delta_{dcr+2} < 1) \quad (34)$$

Each element δ1, δ2, . . . of the forgetting coefficient vector δ is set to a value more than 0 and less than 1. However, as described above, it is preferable that one of δ1, δ2, . . . is set to a value of 1.

An identification error ide_cr(k) included in the equation (30) is expressed as by the equation (35). Cr_hat is calculated based on the prediction equation (23) and the previous value θcr(k−1) of the parameter vector. The identifier 93 determines the parameter vector θcr so that an error between the compression ratio Cr_hat calculated based on the prediction equation and the actual compression ratio Cr becomes zero (that is, so that the identification error ide_cr becomes zero).

$$\mathrm{ide\_cr}(k) = Cr\_hat(k) - Cr(k) \quad (35)$$

where $Cr\_hat(k) = \theta cr^T(k-1)\zeta cr(k)$ $\zeta cr^T(k) = [Cr(k-dcr+1), Cr(k-dcr), U\_Cr(k-dcr), U\_Cr(k-dcr-1), \ldots, U\_Cr(k-2dcr+2), 1]$ $\quad (36)$ The gain KPcr(k) included in the equation (30) is expressed as shown in the equation (37).

$$KPcr(k) = \frac{P(k-1) \cdot \zeta(k)}{1 + \zeta^T(k) \cdot P(k-1) \cdot \zeta(k)} \quad (37)$$

$$P(k) = \frac{1}{\lambda 1}\left(I - \frac{\lambda 2 \cdot P(k-1) \cdot \zeta(k) \cdot \zeta^T(k)}{\lambda 1 + \lambda 2 \cdot \zeta^T(k) \cdot P(k-1) \cdot \zeta(k)}\right) P(k-1) \quad (38)$$

where $I$ is a unit matrix of $(3 \times 3)$

The dynamic characteristics of the lift amount Lift can be modeled in a similar way to the equation (22) for the compression ratio. The lift controller 55 has a similar structure to the variable compression ratio controller shown in FIG. 15 and calculates a command value U_Lift that is to be input into the variable lift mechanism 26 in a similar way.

The desired value response assignment parameter, the disturbance suppression response assignment parameter and the feedback gain for the lift amount have the following relationship:

$-1 < POLElift\_f1, POLElift\_f2, POLElift\_f3 < POLElift\_f4 < 0$ $-1 < POLElift1, POLElift2, POLElift3 < POLElift4 < 0$ $0 < Krchlift1, Krchlift2, Krchlift3 < Krchlift4$ As can been seen from the above relationship, these parameter values are defined so that the convergence speed of the controlled variable E_lift (=the predicted value Pre_Lift(k)—the desired value Lift_cmd_f(k)) is faster in Mode 4 in which the lift amount is selected as a master parameter than in Mode 1, Mode 2 and Mode 3 in which the lift amount is selected as a slave parameter. Thus, in Mode 4, the lift amount that is a master parameter is controlled to converge more quickly than the slave parameters.

The dynamic characteristics of the phase Cain can be modeled in a similar way to the equation (22) for the compression ratio. The phase controller 56 has a similar structure to the variable compression ratio controller shown in FIG. 15 and calculates a command value U_Cain that is to be input into the variable phase mechanism 27 in a similar way.

The desired value response assignment parameter, the disturbance suppression response assignment parameter and the feedback gain for the phase have the following relationship:

$-1 < POLEcain\_f1, POLEcain\_f3, POLEcain\_f4 < POLEcain\_f2 < 0$ $-1 < POLEcain1, POLEcain3, POLEcain4 < POLEcain2 < 0$ $0 < Krchcain1, Krchcain3, Krchcain4 < Krchcain2$ As can been seen from the above relationship, these parameter values are defined so that the convergence speed of the controlled variable E_Cain (=the predicted value Pre_Cain(k)—the desired value Cain_cmd_f(k)) is faster in Mode 2 in which the phase is selected as a master parameter than in Mode 1, Mode 3 and Mode 4 in which the phase is selected as a slave parameter. Thus, in Mode 2, the phase that is a master parameter is controlled to converge more quickly than the slave parameters.

Control Flow

Figure 16:
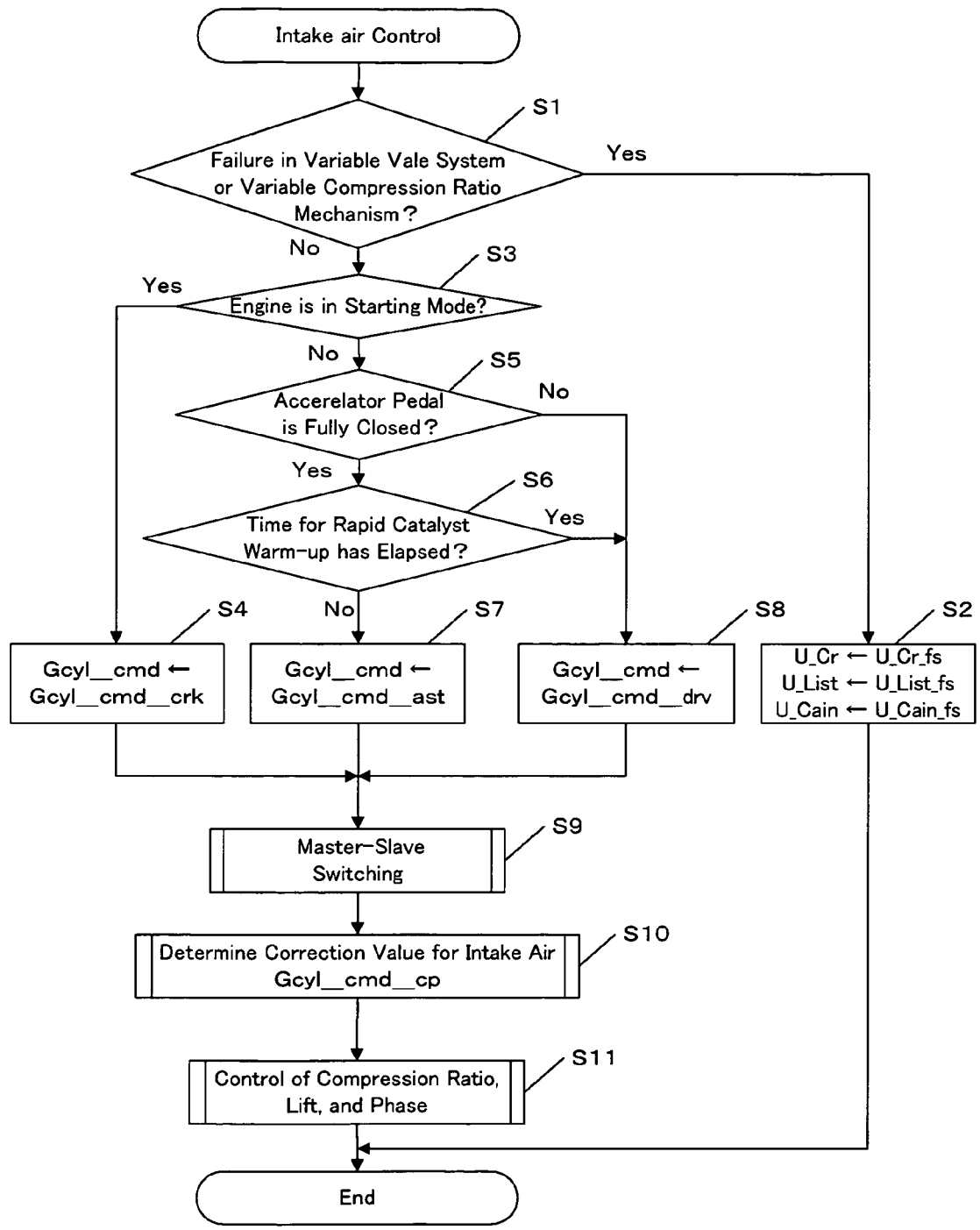
FIG. 16 is a flowchart of an intake air amount control process in accordance with one embodiment of the present invention.

FIG. 16 shows a flowchart of a process for performing the intake air amount control. This process is performed at a predetermined time interval (for example, 10 milliseconds).

In step S1, it is determined whether a failure has been detected in any of the variable compression mechanism, the variable lift mechanism and the variable phase mechanism. If a failure has been detected, the engine output cannot be controlled by these mechanisms. In step S2, predetermined values for a fail safe control are set in the control inputs into these mechanisms and then this process is terminated. A value U_Cr_fs that is set in the control input U_Cr into the variable compression mechanism is a value for implementing a minimum compression ratio. A value U_Lift_fs that is set in the control input U_Lift into the variable lift mechanism is a value for implementing a lift of, for example, about 0.5 mm for enabling the vehicle traveling at a very slow speed (called "creeping" traveling). A value U_Cain_fs that is set in the control input U_Cain into the variable phase mechanism acts to retard the phase.

Figure 21:
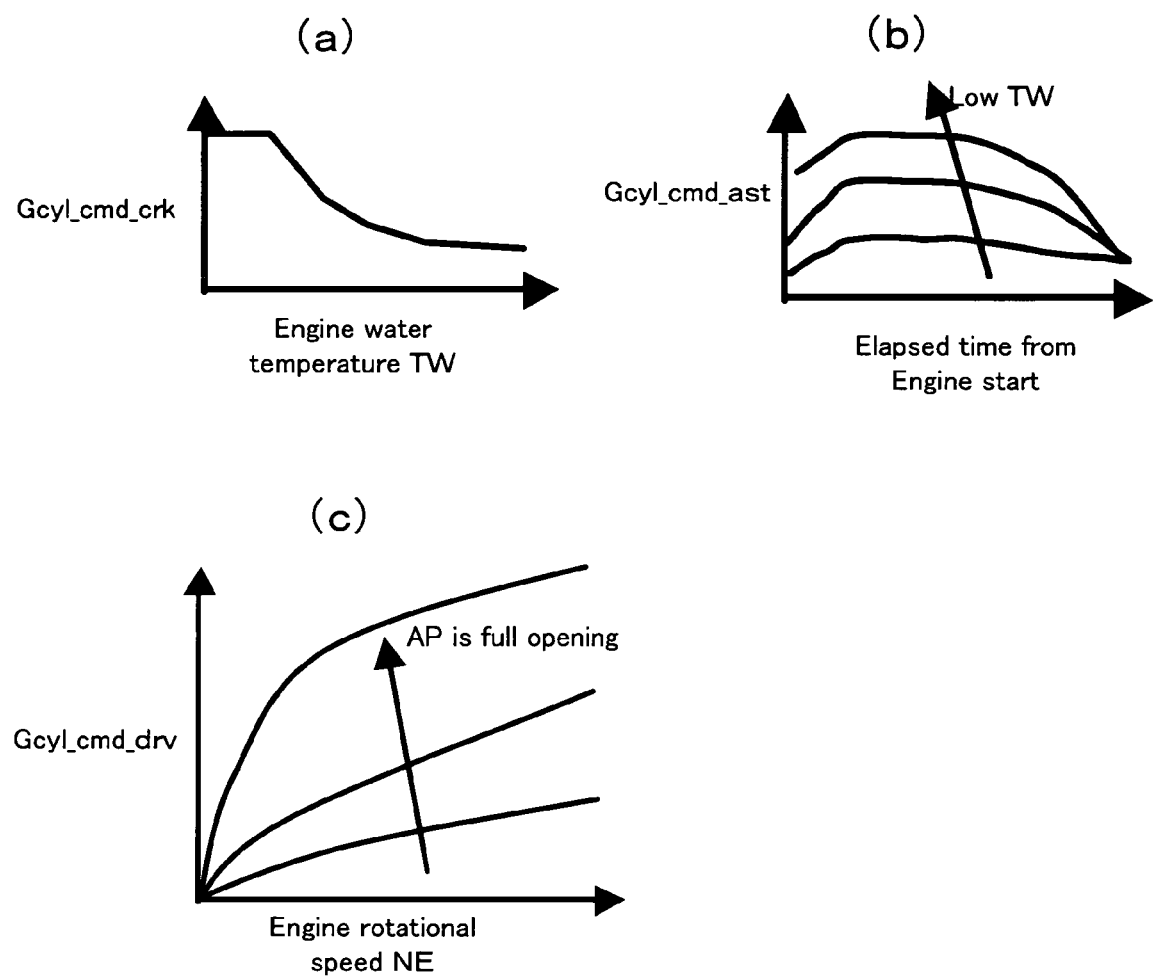
FIG. 21 shows an example of maps that are used for determining a desired intake air amount in accordance with one embodiment of the present invention.

If the answer of step S1 is "No", it is determined in step S3 whether the engine is in the starting mode. If the engine is in the starting mode, a value Gcyl_cmd_crk corresponding to the detected engine water temperature TW is set in the desired intake air amount Gcyl_cmd (S4). FIG. 21(*a*) shows the intake air amount Gcyl_cmd_crk that is to be set in accordance with the engine water temperature TW. This map may be stored in the memory 1*c* (FIG. 1).

If the answer of step S3 is "No", it is determined in step S5 whether an accelerator pedal is fully closed. If the accelerator pedal is fully closed, it indicates that the engine is idling. Then, in step S6, it is determined whether a predetermined time that is set for performing a rapid catalyst warm-up control has elapsed. If the predetermined time has not yet elapsed, it indicates that the rapid catalyst warm-up control is still underway. The rapid catalyst warm-up control is a control for temporarily increasing the intake air amount so as to rapidly activate the catalyst. In step S7, a value Gcyl_cmd_ast corresponding to the elapsed time after the start of the engine is set in the desired intake air amount Gcyl_cmd. FIG. 21(*b*) shows the intake air amount Gcyl_cmd_ast that is to be set in accordance with the elapsed time. This map may be stored in the memory 1*c* (FIG. 1).

If the catalyst warm-up control has been completed in step S6, it indicates that the engine is warm. In step S8, a value Gcyl_cmd_drv corresponding to the detected engine rotational speed NE and the accelerator pedal opening angle AP is set in the desired intake air amount Gcyl_cmd. FIG. 21(*c*) shows the value Gcyl_cmd_drv that is to be set in accordance with the engine rotational speed NE and the accelerator pedal opening angle AP. This map may be stored in the memory 1*c* (FIG. 1).

Figure 18:
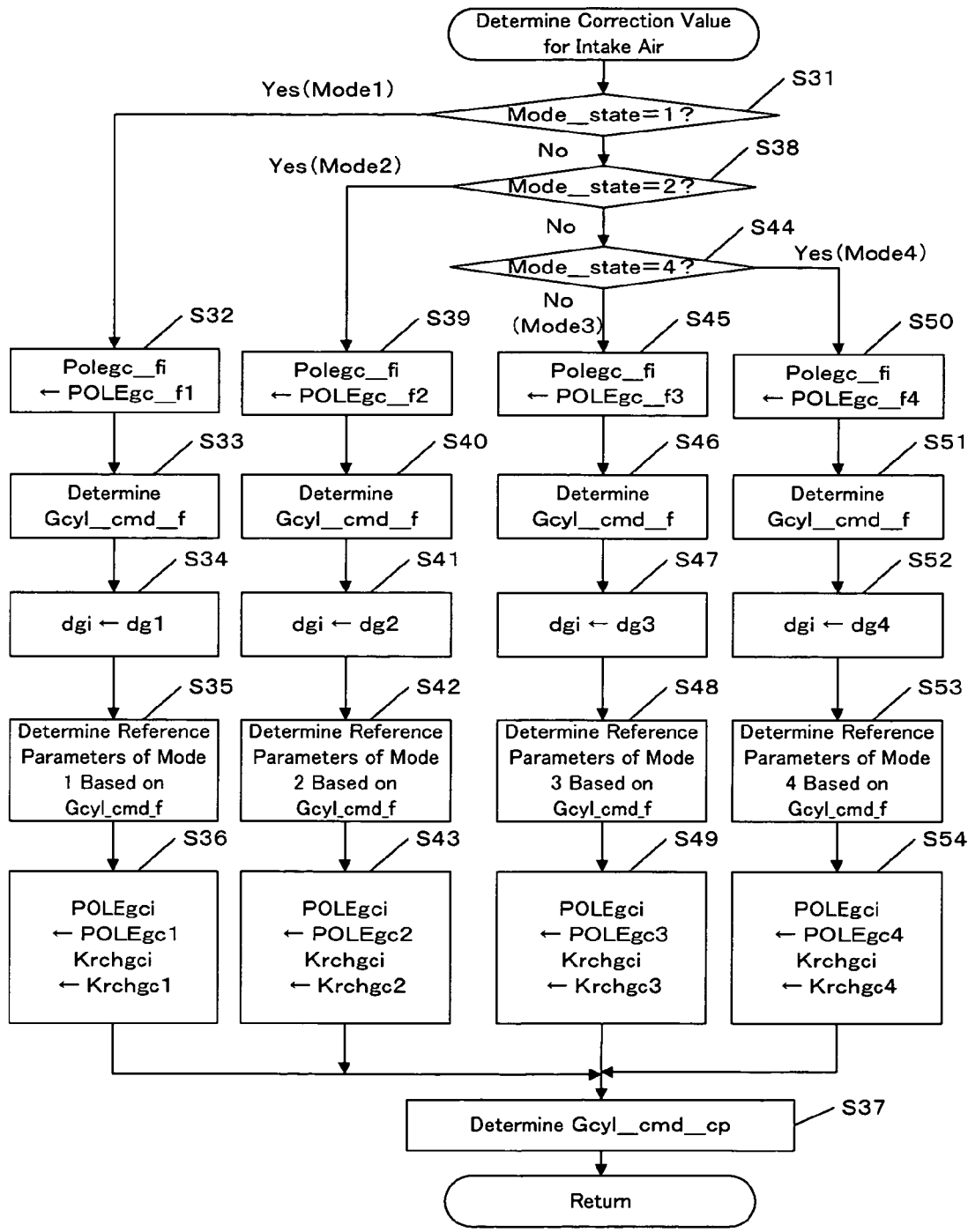
FIG. 18 is a flowchart of a process for determining an intake air amount correction value in accordance with one embodiment of the present invention.
Figure 19:
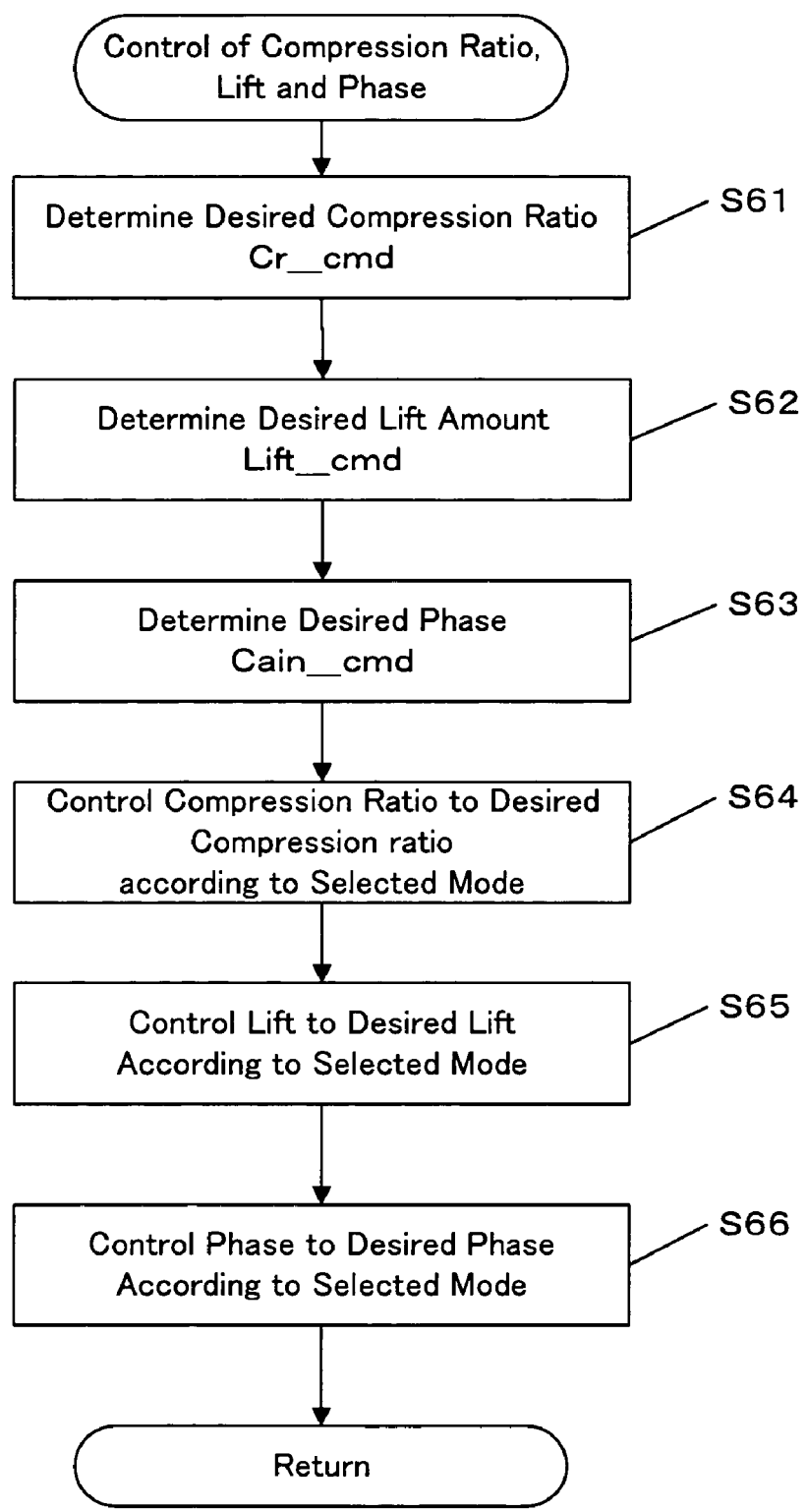
FIG. 19 is a flowchart of a process for controlling a compression ratio, a lift amount and a phase in accordance with one embodiment of the present invention.

In step S9, a subroutine (FIG. 17) for the master-slave switching is performed to select a master parameter from the compression ratio, the lift and the phase. In step S10, calculation by the intake air amount controller 53 is performed to determine the correction value Gcyl_cmd_cp for causing the actual intake air amount to converge to the desired intake air amount (FIG. 18). In step S11, operations by the compression ratio controller, the lift controller and the phase controller are performed so that the compression ratio, the lift and the phase converge to the desired compression ratio, the desired lift and the desired phase, respectively (FIG. 19).

Figure 17:
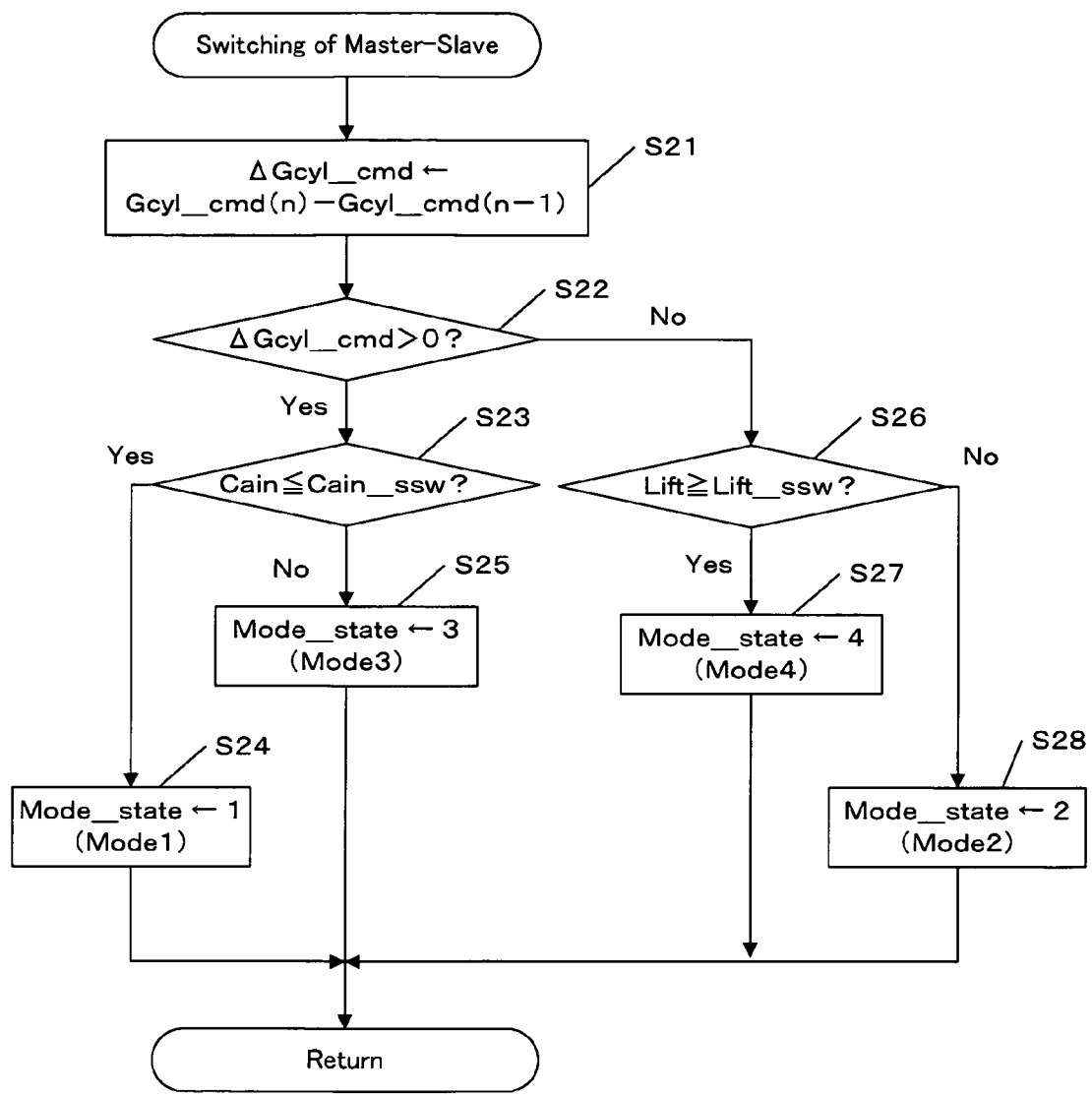
FIG. 17 a flowchart of a master-slave switching process in accordance with one embodiment of the present invention.

FIG. 17 shows a subroutine of the master-slave switching performed in step S9 of FIG. 16.

In step S21, a change Δ Gcyl_cmd in the desired intake air amount is calculated in accordance with the equation (39).

$\Delta Gcyl\_cmd = Gcyl\_cmd(n) - Gcyl\_cmd(n-1)$ \hspace{1em} (39)

In step S22, if the change Δ Gcyl_cmd in the desired intake air amount is greater than zero, it indicates that the requested driving force is increasing. If the change Δ Gcyl_cmd in the desired intake air amount is equal to or less than zero, it indicates that the requested driving force is decreasing.

If the requested driving force is increasing, the actually detected phase Cain is compared with a predetermined value Cain_ssw (S23). An example of the predetermined value Cain_ssw is shown in FIG. 4.

If Cain≦Cain_ssw, it indicates Mode 1 where the engine load is extremely low. A value of 1 indicating Mode 1 is set in the mode signal Mode_state (S24).

If Cain>Cain_ssw, it indicates Mode 3 where the engine load is between low and high as shown in FIG. 4. A value of 3 indicating Mode 3 is set in the mode signal Mode_state (S25).

If the requested driving force is decreasing in step S22, the actually detected lift Lift is compared with a predetermined value Lift_ssw (S26). An example of the predetermined value Lift_ssw is shown in FIG. 4. If Lift≧Lift_ssw, it indicates Mode 4 where the engine load is between low and high. A value of 4 indicating Mode 4 is set in the mode signal Mode_state (S27).

If Lift<Lift_ssw, it means Mode 2 where the engine load is extremely low as shown in FIG. 4. A value of 2 indicating Mode 2 is set in the mode signal Mode_state (S28).

FIG. 18 is a flowchart of a process for determining the intake air amount correction value Gcyl_cmd_cp, which is performed in step S10 of FIG. 16.

In step S31, it is determined whether the value of the mode signal Mode_state is 1. If Mode_state=1, the value POLEgc_fi for Mode 1 is set in the desired value response assignment parameter POLEgc_fi so as to implement Mode 1 (S32) and the desired intake air amount Gcyl_cmd_f is calculated by using the parameter thus set in accordance with the equation (5) (S33).

Figure 22:
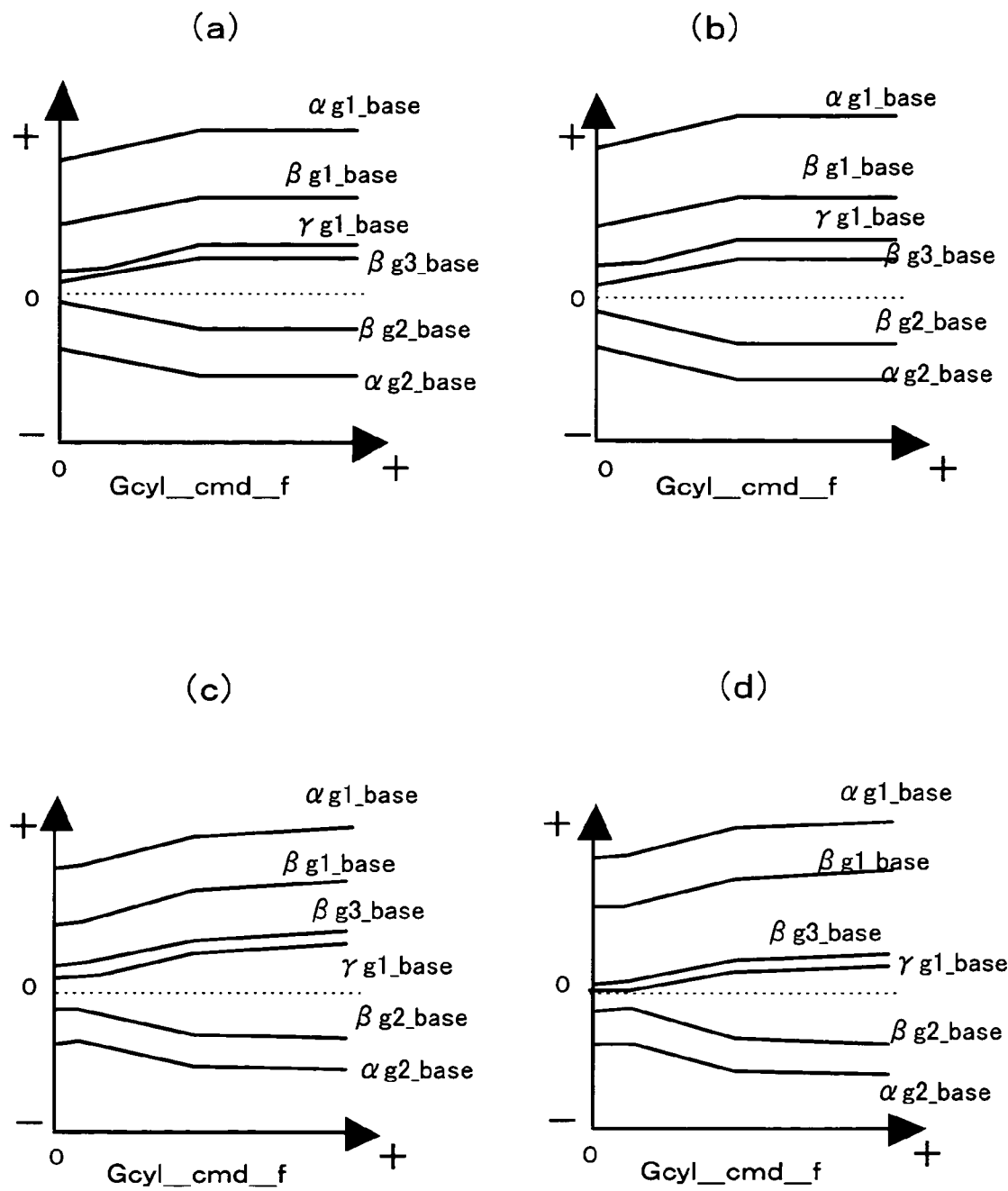
FIG. 22 shows an example of maps that are used for determining parameter reference values for each mode in accordance with one embodiment of the present invention.

In step S34, a dead time dg1 for Mode 1 is set in the dead time dgi. In step S35, a map as shown in FIG. 22(a) is referred to based on the desired intake air amount Gcyl_cmd_f to determine the reference values of the model parameters for Mode 1. In step S36, the value Polegc1 for Mode 1 is set in the disturbance suppression response assignment parameter POLEgci and the value Krchgc1 for Mode 1 is set in the feedback gain Krchgci.

In step S37, the above-described equation (8) is performed to calculate the correction value Gcyl_cmd_cp.

If the value of the mode signal Mode_state is 2 in step S38, a process for Mode 2 is performed in step S39 through step S43 in a similar way to the process (S32 through S36) for Mode 1.

If the value of the mode signal Mode_state is 4 in step S44, a process for Mode 4 is performed in step S50 through step S54 in a similar way to the process (S32 through S36) for Mode 1.

If the value of the mode signal Mode_state is not 4 in step S44, it indicates that the value of the mode signal Mode_state is 3. A process for Mode 3 is performed in step S45 through step S49 in a similar way to the process (S32 through S36) for Mode 1.

FIG. 19 is a flowchart of a process performed in step S11 of FIG. 16 for controlling the compression ratio, the lift amount and the phase.

Figure 9:
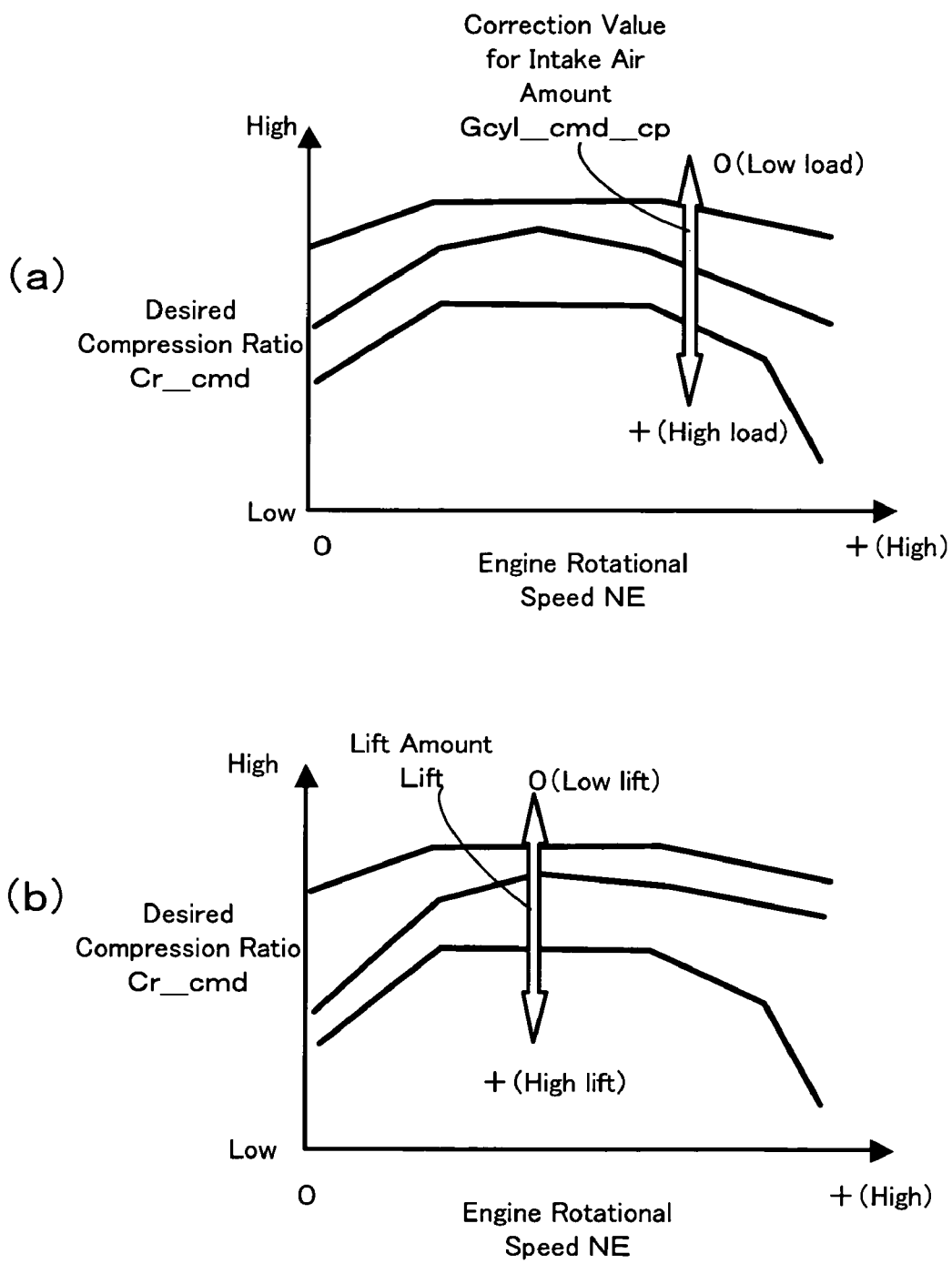
FIG. 9 shows an example of tables that are used for determining a desired compression ratio in accordance with one embodiment of the present invention.

In step S61, a table is referred to in accordance with the value of the mode signal Mode_state to determine the desired compression ratio Cr_cmd. Such a table is shown in FIG. 9. For example, as described above referring to FIG. 8, when Mode_state=1, the table shown in FIG. 9(a) is referred to.

Figure 10:
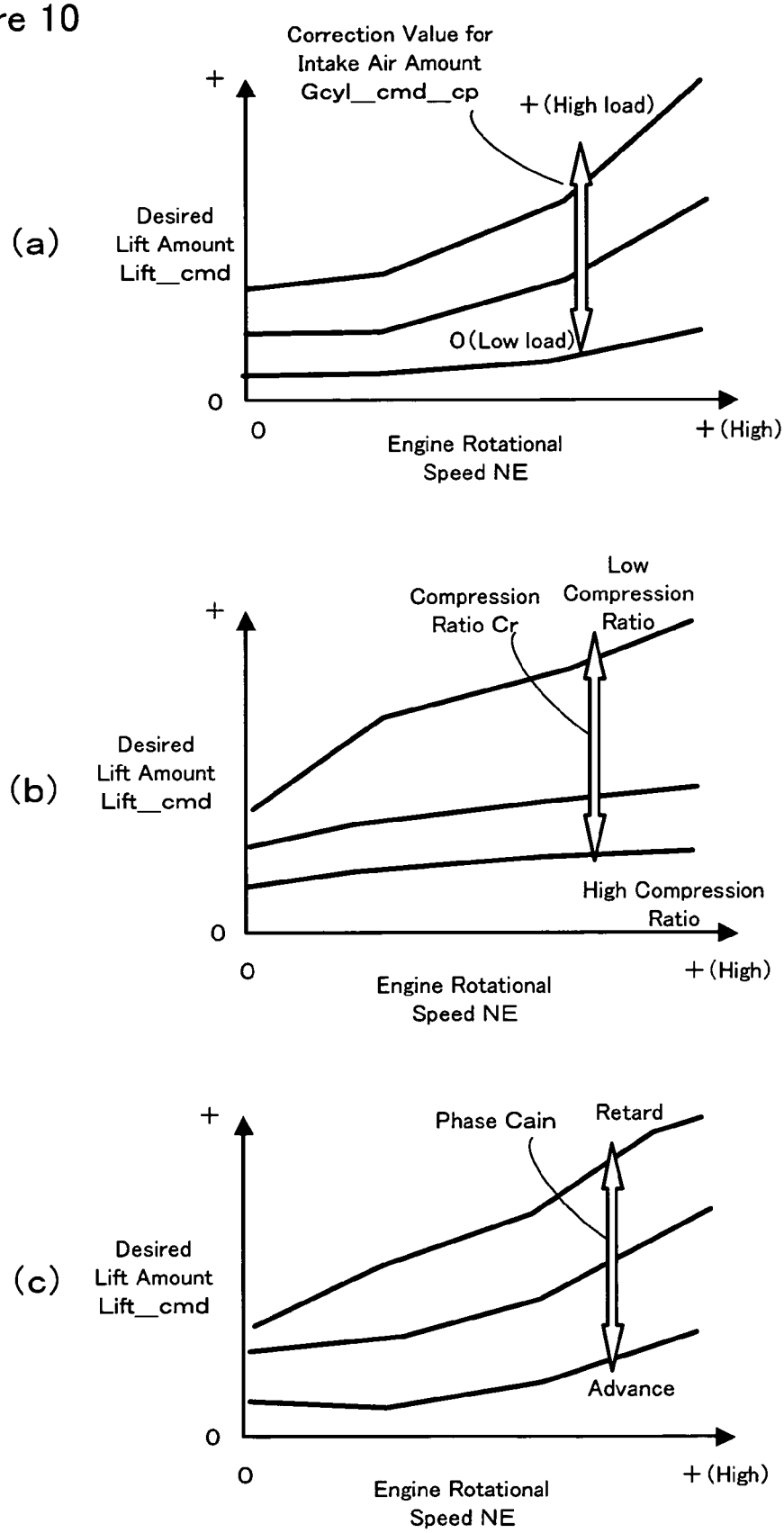
FIG. 10 shows an example of tables that are used for determining a desired lift amount in accordance with one embodiment of the present invention.

Similarly, in step S62, a table is referred to in accordance with the value of the mode signal Mode_state to determine the desired lift amount Lift_cmd. Such a table is shown in FIG. 10. Similarly, in step S63, a table is referred to in accordance with the value of the mode signal Mode_state to determine the desired phase Cain_cmd. Such a table is shown in FIG. 11.

In step S64, a command value U_Cr for the variable compression ratio mechanism 25 is calculated in accordance with the equation (26). In step S65, in a similar way to the calculation of the command value U_Cr for the compression ratio, a command value U_Lift for the variable lift mechanism 26 is calculated. In step S66, in a similar way to the calculation of the command value U_Cr for the compression ratio, a command value U_Cain for the variable phase mechanism 27 is calculated. Thus, the compression ratio, the lift amount and the phase are controlled to converge to the respective desired values in accordance with the selected mode.

Preferably, the operation cycle for step S64 through step S66 is set to be shorter than the operation cycle for the calculation of the correction value of the intake air amount and the calculation of the desired intake air amount based on the correction value. In other words, the operation cycle "k" (for example, 2 milliseconds) for the compression ratio controller 54, the lift controller 55 and the phase controller 56 is shorter than the operation cycle "n" (for example, 10 milliseconds) for the intake air amount controller 53, as shown in the above described equations.

The intake air amount and the combustion condition have relatively slow response characteristics. Since the desired values of the compression ratio, the lift amount and the phase are determined to meet such slow response characteristics, the compression ratio, the lift amount and the phase can be controlled so that they follow transitional changes of the intake air amount and the combustion condition with desired accuracy.

Furthermore, behaviors of the variable compression ratio mechanism, the variable lift mechanism and the variable phase mechanism may exhibit non-linear characteristics which are caused by the friction or the like. By shortening the operation cycle for each controller, it can be prevented that such non-linear characteristics influence the compression ratio, the lift amount and the phase.

Figure 20:
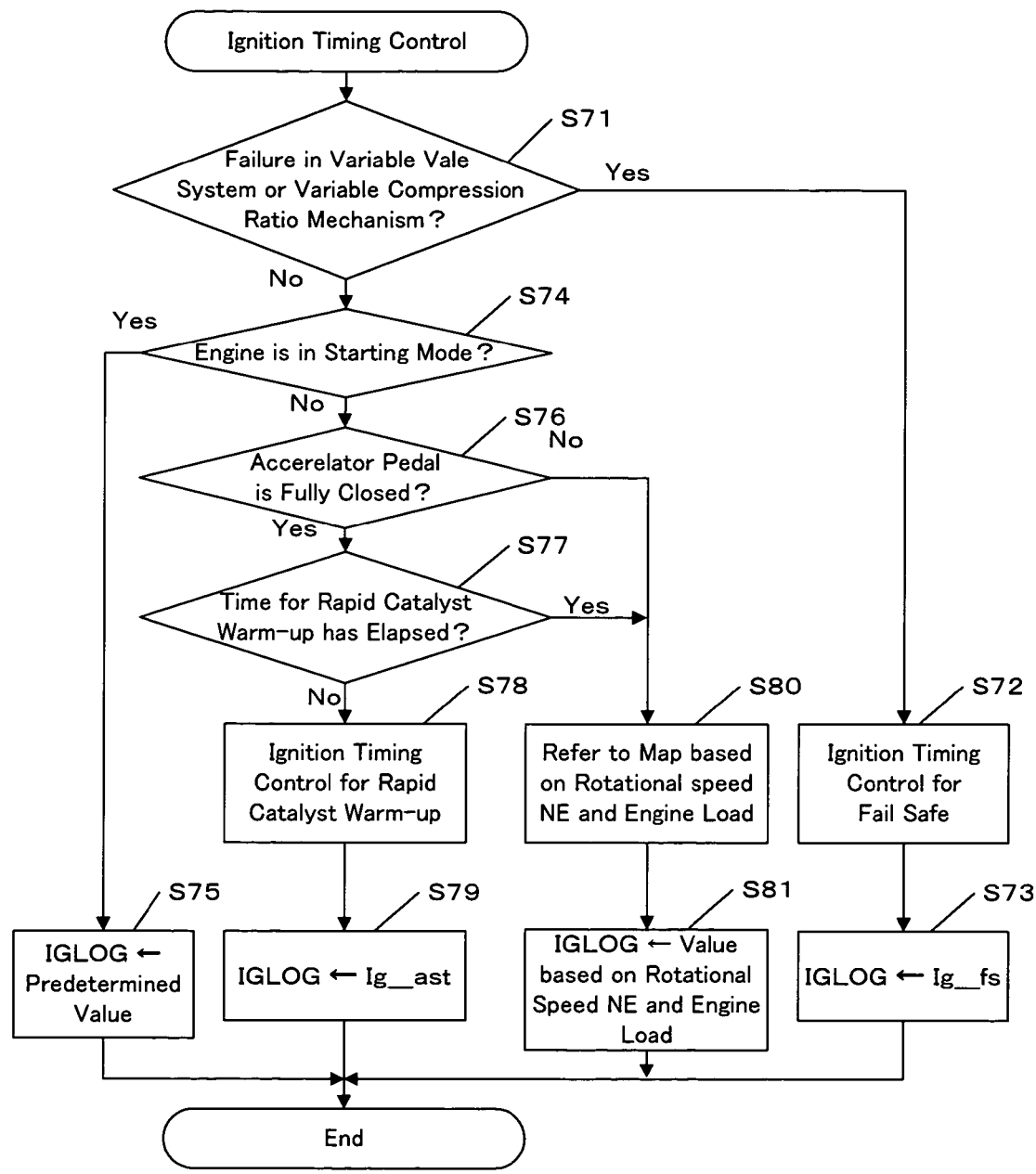
FIG. 20 is a flowchart of an ignition timing control process in accordance with one embodiment of the present invention.

FIG. 20 shows a main routine for the ignition timing control. This routine is performed in synchronization with the detection of the TDC signal.

In step S71, it is determined whether a failure has been detected in any of the variable compression ratio mechanism, the variable lift mechanism and the variable phase mechanism. If a failure has been detected, the engine output cannot be controlled by these mechanisms. Therefore, a fail safe control is performed to calculate an ignition timing for keeping the engine rotational speed at a constant level.

The fail safe control can be implemented, for example, through a simplified response assignment control. An ignition timing Ig_fs is calculated so that the engine rotational speed converges to a predetermined desired value (for example, 2000 rpm). Calculation equations for implementing the simplified response assignment control are shown in the following:

$$\text{Ig\_fs} = \text{Ig\_fs\_base} - Krch' \cdot \sigma'(k) - Kadp' \cdot \sum_{i=0}^{k} \sigma'(i) \quad (40)$$

$$\sigma'(k) = Enfs(k) + \text{POLE}' \cdot Enfs(k-1) \quad (41)$$

$$Enfs(k) = NE(k) - \text{NE\_fs} \quad (42)$$

$Krch'$, $Kadp'$: feedback gain

POLE': response assignment parameter $(-1 < \text{POLE}' < 0)$

NE_fs: desired value of engine rotational speed (ex. 2000 rpm)

Ig_fs_base: reference value for fail safe (ex. 0 deg)

The simplified response assignment control is a simplified version of the above-described 2-degree-of-freedom sliding mode control. In the simplified response assignment control, the control input includes a reaching law input expressed by a proportional term of the switching function and an adaptive law input expressed by an integral term of the switching function as shown in the equation (40). The equivalent control input is not included because a model expression is not established. The adaptive law input is an input for placing the state quantity on the switching line while suppressing a steady-state error. Krch' and Kadp' are predetermined through simulation or the like. This control is the same as the above-described 2-degree freedom sliding mode control in that the state quantity converges by placing the state quantity on the switching line and in that the convergence speed of the controlled variable Enfs to the desired value is specified by the response assignment parameter POLE'.

In step S73, the calculated Ig_fs is set in the ignition timing IGLOG.

In general, during the fail safe control, the compression ratio, the lift amount and the phase cannot be controlled properly. However, if the ignition timing is controlled through the response assignment control, a minimum traveling capability of the vehicle can be maintained while securing the stability of the engine by virtue of robustness of the response assignment control.

If no failure is detected in step S71, it is determined whether the engine is in the starting mode (S74). If the engine is in the starting mode, the ignition timing IGLOG is set to a predetermined value (for example, +10 degrees) (S75).

If the engine is not in the starting mode, it is determined in step S76 whether an accelerator pedal is fully closed. If the accelerator pedal is fully closed, it indicates that the engine is idling. Then, in step S77, it is determined whether a predetermined time that is set for performing the rapid catalyst warm-up control has elapsed. If the predetermined time has not yet elapsed, it indicates that the rapid catalyst warm-up control is still underway. During the rapid catalyst warm-up control, the ignition timing is retarded so that the engine rotational speed converges to a desired value. This control is implemented through the response assignment control in a similar way to step S72. The following are equations for implementing the rapid catalyst warm-up control.

$$\text{Ig\_ast} = \text{Ig\_ast\_base} - Krch'' \cdot \sigma''(k) - Kadp'' \cdot \sum_{i=0}^{k} \sigma''(i) \quad (43)$$

$$\sigma''(k) = Enast(k) + \text{POLE}'' \cdot Enast(k-1) \quad (44)$$

$$Enast(k) = NE(k) - \text{NE\_ast} \quad (45)$$

$Krch''$, $Kadp''$: feedback gain

POLE'': response assignment parameter $(-1 < \text{POLE}'' < 0)$

NE_ast: desired value of engine rotational speed (ex. 1800 rpm)

Ig_ast_base: reference value for rapid catalyst warm-up control (ex. +5 deg)

In step S79, the calculated Ig_ast is set in the ignition timing IGLOG.

Figure 23:
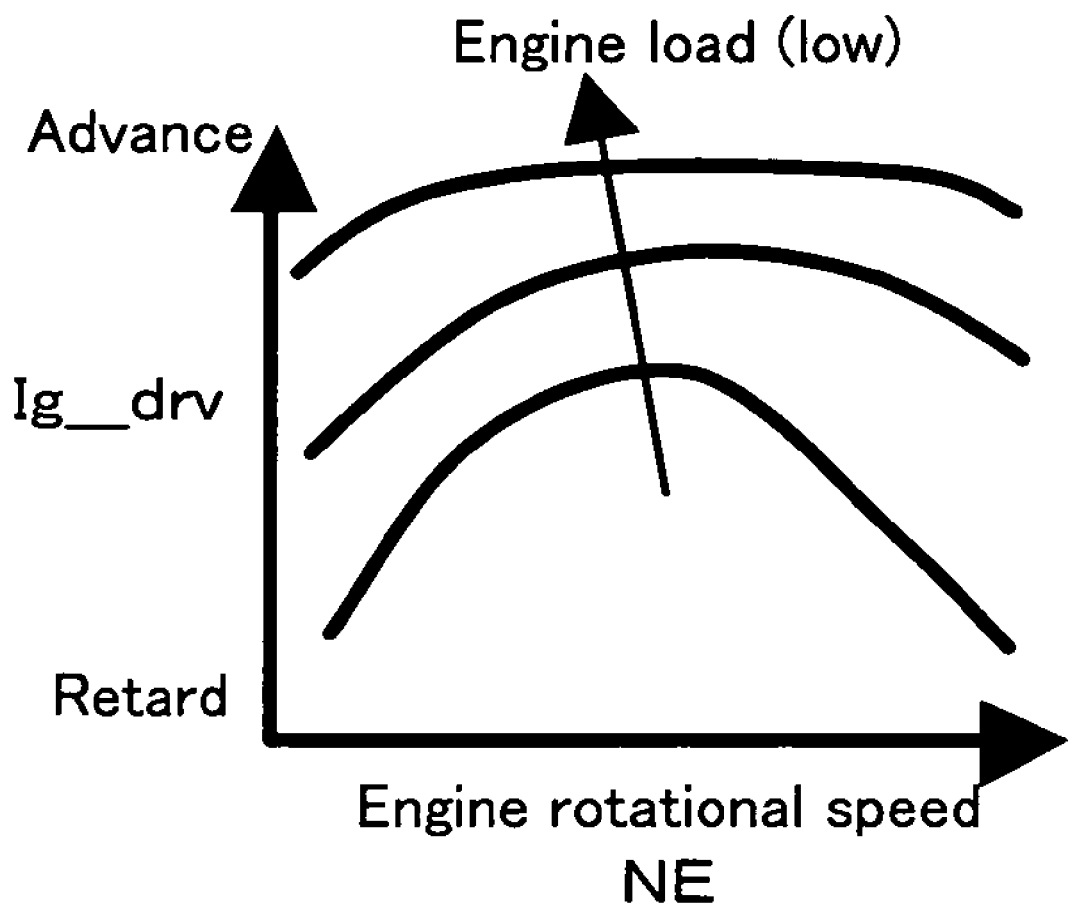
FIG. 23 shows an example of a map that is used for determining an ignition timing after an engine has reached a warm condition in accordance with one embodiment of the present invention.
Figure 24:
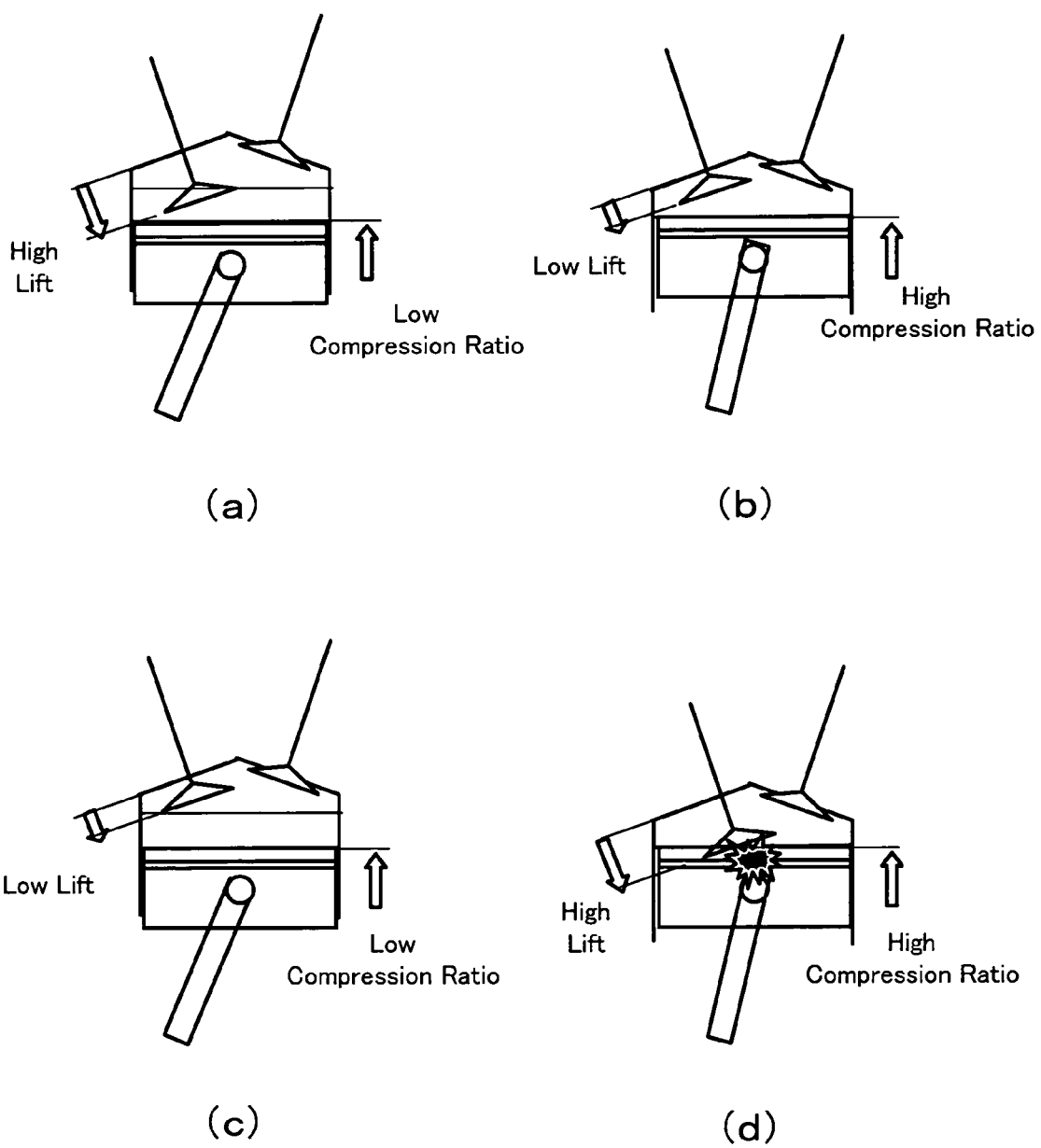
FIG. 24 shows a relationship between a piston and a valve.
Figure 25:
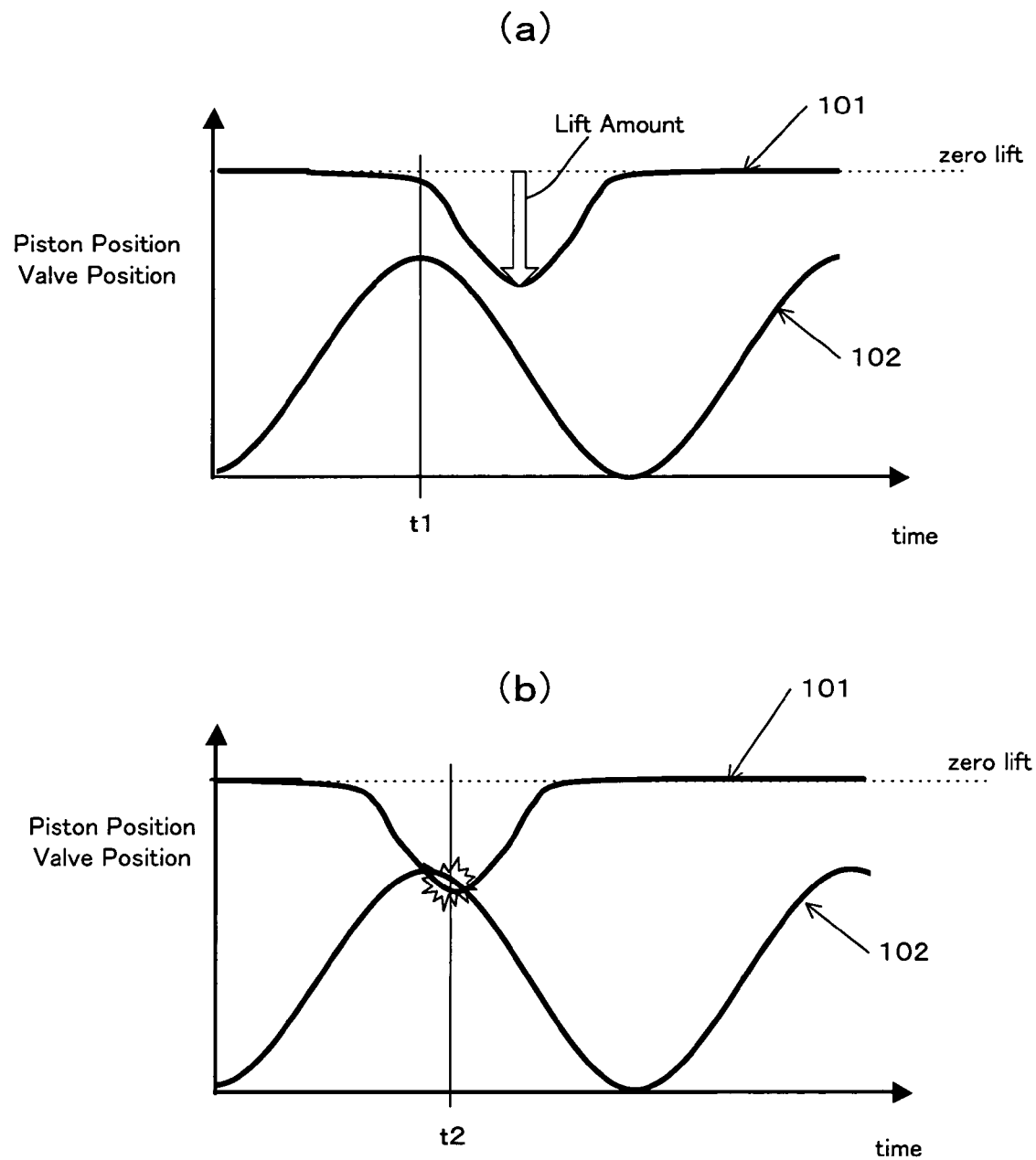
FIG. 25 shows a relationship between a movement of a piston and a phase of a valve.

If the rapid catalyst warm-up control has been completed in step S77, a predetermined map is referred to based on the engine rotational speed NE and the engine load (which is represented, for example, by the intake air amount Gcyl detected by the airflow meter) to determine the ignition timing Ig_drv (S80). An example of such a map is shown in FIG. 23. The ignition timing is set to be more advanced as the engine load becomes lower. In step S81, the determined Ig_drv is set in the ignition timing IGLOG.

The present invention can be applied to a general-purpose engine (for example, an outboard motor).

What is claimed is:

1. A control apparatus for an engine, the engine having a variable lift mechanism that is capable of changing a lift amount of a valve of the engine and a variable compression ratio mechanism that is capable of changing a compression ratio in a combustion chamber of the engine, comprising:
   a control unit configured to control the variable lift mechanism and the variable compression ratio mechanism so that a rate of change of the compression ratio toward a desired value is faster than a rate of change of the lift amount toward a desired value when a requested engine output is increasing.

2. The control apparatus of claim 1, wherein the engine further has a variable phase mechanism that is capable of changing a phase of the valve;
   wherein the control unit is further configured to control the variable compression ratio mechanism and the variable phase mechanism so that a rate of change of the compression ratio toward a desired value is faster than a rate of change of the phase toward a desired value when the requested engine output is increasing.

3. A control apparatus for an engine, the engine comprising a variable lift mechanism that is capable of changing a lift amount of a valve of the engine and a variable compression ratio mechanism that is capable of changing a compression ratio in a combustion chamber of the engine, comprising:
   a control unit configured to control the variable lift mechanism and the variable compression ratio mechanism so that a rate of change of the lift amount toward a desired value is faster than a rate of change of the compression ratio toward a desired value when a requested engine output is decreasing.

4. The control apparatus of claim 3, wherein the engine further comprises a variable phase mechanism that is capable of changing a phase of the valve;
   wherein the control unit is further configured to control the variable compression ratio mechanism and the variable phase mechanism so that a rate of change of the phase toward a desired value is faster than a rate of change of the compression ratio toward a desired value when the requested engine output is decreasing.

5. A control apparatus for an engine, comprising:
   a compression ratio controller for controlling a compression ratio in a combustion chamber of the engine so that the compression ratio converges to a desired compression ratio;
   a lift controller for controlling a lift amount of a valve of the engine so that the lift amount converges to a desired lift amount; and
   a master-slave switching unit for selecting one of the compression ratio and the lift amount as a master parameter and selecting the other as a slave parameter based on a requested engine output, the switching unit designating one of the compression ratio controller and the lift controller that controls the master parameter as a master controller, the switching unit designating the other of the compression ratio controller and the lift controller that controls the slave parameter as a slave controller;
   wherein the master controller determines a desired value for the master parameter based on the requested engine output, and controls an actual measured value of the master parameter to converge to the desired value,
   wherein the slave controller determines a desired value for the slave parameter based on the actual measured value of the master parameter that is acquired as a result of controlling the master parameter, and controls an actual measured value of the slave parameter to converge to the desired value.

6. The control apparatus of claim 5, further a phase controller for controlling a phase of the valve of the engine so that the phase converges to a desired phase,
wherein the master-slave switching unit selects one of the compression ratio, the lift amount and the phase as a master parameter, and selects the others as slave parameters based on the requested engine output,
wherein the master slave switching unit designates one of the compression ratio controller, the lift controller and the phase controller that controls the master parameter as a master controller, and designates the others as slave controllers.

7. The control apparatus of claim 6, wherein the master-slave switching unit selects the compression ratio as the master parameter and selects the lift amount and the phase as the slave parameters when load of the engine is extremely low and the requested engine output is increasing.

8. The control apparatus of claim 6, wherein the master slave switching unit selects the phase as the master parameter and selects the lift amount and the compression ratio as the slave parameters when load of the engine is extremely low and the requested engine output is decreasing.

9. The control apparatus of claim 6, wherein the lift controller sets the desired lift amount based on an actual measured value of the phase that is acquired as a result of the control by the phase controller when load of the engine is extremely low.

10. The control apparatus of claim 6, wherein the master controller is configured to perform a response assignment control that is capable of specifying a response speed of the master parameter to a desired value,
wherein the slave controllers are configured to perform a response assignment control that is capable of specifying a response speed of the slave parameters to desired values,
wherein the master controller sets the response speed of the master parameter so that the response speed of the master parameter is faster than a response speed of the slave parameters.

11. The control apparatus of claim 6, further comprising an intake air controller for determining a correction value for causing an intake air amount into the engine to converge to a desired intake air amount that implements the requested engine output,
wherein the master controller determines the desired value of the master parameter based on the correction value.

12. The control apparatus of claim 6, further comprising a fail safe means for stopping the control by the compression ratio controller, the lift controller and the phase controller if a failure is detected in one of a variable compression ratio mechanism controlled by the compression ratio controller, a variable lift mechanism controlled by the lift controller and a variable phase mechanism controlled by the phase controller, and for controlling an ignition timing by a response assignment control to maintain a rotational speed of the engine at a predetermined value.

13. The control apparatus of claim 5, wherein the master-slave switching unit selects the compression ratio as the master parameter and selects the lift amount as the slave parameter when the requested engine output is increasing.

14. The control apparatus of claim 5, wherein the master-slave switching unit selects the lift amount as the master parameter and selects the compression ratio as the slave parameter when the requested engine output is decreasing.

15. The control apparatus of claim 5, wherein the master controller is configured to perform a response assignment control that is capable of specifying a response speed of the master parameter to a desired value,
wherein the slave controller is configured to perform a response assignment control that is capable of specifying a response speed of the slave parameter to a desired value,
wherein the master controller sets the response speed of the master parameter so that the response speed of the master parameter is faster than a response speed of the slave parameter.

16. The control apparatus of claim 5, further comprising an intake air controller for determining a correction value for causing an intake air amount into the engine to converge to a desired intake air amount that implements the requested engine output,
wherein the master controller determines the desired value of the master parameter based on the correction value.

17. The control apparatus of claim 16, wherein the intake air controller is configured to perform a response assignment control that is capable of specifying a response speed of the intake air amount to the desired intake air amount,
wherein the intake air controller sets the response speed in accordance with whether the requested engine output is increasing or decreasing.

18. The control apparatus of claim 16, wherein the intake air controller sets the response speed of the intake air in accordance with load of the engine.

19. The control apparatus of claim 16, wherein an operation cycle in which the correction value is determined by the intake air controller is set to be longer than an operation cycle in which the master parameter and the slave parameter are determined by the master controller and the slave controller.

20. A method for controlling an engine having a variable lift mechanism that is capable of changing a lift amount of a valve of the engine and a variable compression ratio mechanism that is capable of changing a compression ratio in a combustion chamber of the engine, comprising the step of:
controlling the variable lift mechanism and the variable compression ratio mechanism so that a rate of change of the compression ratio toward a desired value is faster than a rate of change of the lift amount toward a desired value when a requested engine output is increasing.

21. The method of claim 20, wherein the engine further has a variable phase mechanism that is capable of changing a phase of the valve;
wherein the method further comprises the step of:
controlling the variable phase mechanism and the variable compression ratio so that a rate of change of the compression ratio toward a desired value is faster than a rate of change of the phase toward a desired value when the requested engine output is increasing.

22. A method for controlling an engine having a variable lift mechanism that is capable of changing a lift amount of a valve of the engine and a variable compression ratio mechanism that is capable of changing a compression ratio in a combustion chamber of the engine, comprising the step of:
controlling the variable lift mechanism and the variable compression ratio mechanism so that a rate of change of the lift amount toward a desired value is faster than a rate of change of the compression ratio toward a desired value when a requested engine output is decreasing.

23. The method of claim 22, wherein the engine further has a variable phase mechanism that is capable of changing a phase of the valve;
wherein the method further comprises the step of:
controlling the variable phase mechanism and the variable compression ratio so that a rate of change of the phase toward a desired value is faster than a rate of change of the compression ratio toward a desired value when the requested engine output is decreasing.

24. A method for controlling an engine, comprising the steps of:
- (a) selecting one of a compression ratio in a combustion chamber of the engine and a lift amount of a valve of the engine as a master parameter and selecting the other as a slave parameter based on a requested engine output;
- (b) determining a desired value for the master parameter based on the requested engine output;
- (c) controlling an actual measured value of the master parameter to converge to the desired value determined in the step (b);
- (d) determining a desired value for the slave parameter based on the actual measured value of the master parameter that is acquired as a result of the control of the master parameter in the step (c); and
- (e) controlling an actual measured value of the slave parameter to converge to the desired value determined in the step (d).

25. The method of claim 24, wherein the step (a) comprises selecting the compression ratio as the master parameter and selecting the lift amount as the slave parameter when the requested engine output is increasing.

26. The method of claim 24, wherein the step (a) comprises selecting the lift amount as the master parameter and selecting the compression ratio as the slave parameter when the requested engine output is decreasing.

27. A method for controlling an engine, comprising the steps of:
- (a) selecting one of a compression ratio in a combustion chamber of the engine, a lift amount of a valve of the engine and a phase of the valve as a master parameter and selecting the others as slave parameters based on a requested engine output;
- (b) determining a desired value for the master parameter based on the requested engine output;
- (c) controlling an actual measured value of the master parameter to converge to the desired value determined in the step (b);
- (d) determining desired values for the slave parameters based on the actual measured value of the master parameter that is acquired as a result of the control of the master parameter in the step (c); and
- (e) controlling actual measured values of the slave parameters to converge to the desired values determined in the step (d).

28. The method of claim 27, wherein the step (a) comprises selecting the compression ratio as the master parameter and selecting the lift amount and the phase as the slave parameters when load of the engine is extremely low and the requested engine output is increasing.

29. The method of claim 27, wherein the step (a) comprises selecting the phase as the master parameter and selecting the lift amount and the compression ratio as the slave parameters when load of the engine is extremely low and the requested engine output is decreasing.

30. The method of claim 27, wherein a desired value of the lift amount is determined based on an actual measured value of the phase that is acquired as a result of controlling the phase when load of the engine is extremely low.

* * * * *